US012726131B2

(12) United States Patent
Chan et al.

(10) Patent No.: US 12,726,131 B2
(45) Date of Patent: Sep. 1, 2026

(54) ADAPTIVE POWER CONTROL FOR TWO-STAGE AC/DC OR DC/DC ISOLATED POWER CONVERTERS

(71) Applicant: Hong Kong Applied Science and Technology Research Institute Company Limited, Hong Kong (HK)

(72) Inventors: Yiu Pang Chan, Hong Kong (HK); Tin Ho Li, Hong Kong (HK); Kai Wing Andy Yeung, Hong Kong (HK); Qingchun Li, Hong Kong (HK)

(73) Assignee: Hong Kong Applied Science and Technology Research Institue Company Limited, Hong Kong (HK)

( * ) Notice: Subject to any disclaimer, the term of this patent is extended or adjusted under 35 U.S.C. 154(b) by 1107 days.

(21) Appl. No.: 17/846,116

(22) Filed: Jun. 22, 2022

(65) Prior Publication Data

US 2022/0337166 A1 Oct. 20, 2022

Related U.S. Application Data

(63) Continuation-in-part of application No. 16/561,274, filed on Sep. 5, 2019, now Pat. No. 11,407,322.

(51) Int. Cl.

| | |
|---|---|
| ***H02M 3/335*** | (2006.01) |
| ***H02J 7/06*** | (2006.01) |
| ***H02J 7/80*** | (2026.01) |
| ***H02M 1/42*** | (2007.01) |

(52) U.S. Cl.

CPC ........... *H02M 3/33584* (2013.01); *H02J 7/06* (2013.01); *H02J 7/80* (2026.01); *H02M 1/4233* (2013.01); *H02M 3/33573* (2021.05); *H02J 2207/20* (2020.01)

(58) Field of Classification Search

CPC ......... H02M 3/33584; H02M 3/33573; H02M 3/01; H02M 1/4233; H02M 1/007;

(Continued)

(56) References Cited

U.S. PATENT DOCUMENTS 5,446,365 A * 8/1995 Nomura .................. B60L 50/40 320/DIG. 34
9,263,968 B2 2/2016 Potts et al.

(Continued)

FOREIGN PATENT DOCUMENTS

CN 106972750 A 7/2017
CN 107994777 A 5/2018

(Continued)

OTHER PUBLICATIONS

Pablo Guzman, et al., "Two-stage modulation study for DAB converter", MDPI—Electronics 2021, 10, 2561, Oct. 20, 2021.

*Primary Examiner* — Julian D Huffman
*Assistant Examiner* — Johali A Torres Ruiz
(74) *Attorney, Agent, or Firm* — gPatent LLC; Stuart T. Auvinen

(57) ABSTRACT

A two-stage power converter has a Power-Factor Converter (PFC) and a Dual Active Bridge (DAB) converter connected together by a DC link voltage. The DAB converter outputs a battery voltage with a battery current. A PFC controller divides a reference power constant by the battery voltage to get a battery current reference that is multiplied by a constant and compared to the DC link voltage to adjust Pulse-Width-Modulation (PWM) control signals to the PFC. The reference power constant is compared to the battery current during Constant-Power mode to cause a DAB controller to modulate duty ratio and phase difference between primary and secondary-side PWM control signals to the DAB converter. The DAB converter duty ratio and phase difference are modulated by comparing the battery current to (Continued)

a battery current limit during Constant-Current mode and by comparing the battery voltage to a battery voltage limit during Constant-Voltage mode.

14 Claims, 15 Drawing Sheets

(58) Field of Classification Search
CPC ...... H02M 1/38; H02J 7/06; H02J 7/80; H02J 2207/20; Y02T 10/70; Y02T 10/7072
See application file for complete search history.

(56) References Cited

U.S. PATENT DOCUMENTS 10,389,166 B1* 8/2019 Sahoo .................... H02J 3/381
2012/0257429 A1* 10/2012 Dong ................. H02M 3/1582 363/127
2016/0016479 A1* 1/2016 Khaligh ............. H02M 1/4258 336/170
2017/0279287 A1* 9/2017 Solodovnik ............ B60L 53/22
2018/0076723 A1 3/2018 Li et al.
2020/0014306 A1* 1/2020 Riar ....................... H02J 7/855
2020/0321880 A1* 10/2020 Lee ......................... H02H 7/12
2021/0313870 A1 10/2021 Iwabuki et al.

FOREIGN PATENT DOCUMENTS

| | | | |
|---|---|---|---|
| CN | 106849686 | B | 8/2018 |
| CN | 108988451 | A | 12/2018 |
| CN | 106559006 | B | 2/2019 |
| CN | 109361318 | A | 2/2019 |
| CN | 109980761 | A | 7/2019 |
| CN | 110518679 | A | 11/2019 |
| CN | 111433075 | A | 7/2020 |
| CN | 112072719 | A | 12/2020 |
| CN | 112769153 | A | 5/2021 |

* cited by examiner

C
USE PFC DIGITAL CTLR TO ADJUST PWM TO FIRST STAGE BY COMPARING VLNK TO VLNK_REF
552
USE DAB DIGITAL CTLR TO GENERATE CTL SIGNALS WITH PHASE-SHIFT CTL TO PRIMARY AND SECOND TRANSISTORS BY COMPARING IBAT TO IBAT_REF FOR CP/CC MODE, OR VBAT TO VBAT_MAX FOR CV MODE
554
A

CONSTANT CURRENT (CC)
CONSTANT POWER (CP)
VBAT
VLNK
V
800
700
600
500
400
300
200
100
TIME
T0
T1
T2
T3
T4
IBAT (A)
15
10
5
TIME
OUTPUT POWER (KW)
8
6
4
2
TIME

CHARGING MODE

ADAPTIVE POWER CONTROL FOR TWO-STAGE AC/DC OR DC/DC ISOLATED POWER CONVERTERS

RELATED APPLICATION

This application in a Continuation-In-Part (CIP) of U.S. Ser. No. 16/561,274 filed Sep. 5, 2019.

FIELD OF THE INVENTION

This invention relates to two-stage power converters, and more particularly to adaptive control of the two-stage power converters.

BACKGROUND OF THE INVENTION

Electric Vehicles (EV's) are rapidly being adopted in many countries as governments subsidize EV's and EV chargers to meet clean-energy goals. Greenhouse gas emissions such as $CO_2$ can be dramatically reduced when EV's are charged from electricity generated from clean energy sources such as hydroelectricity or solar.

FIG. 1 shows a prior-art two-stage power converter for charging an EV battery. An Alternating Current (AC) is input to the first stage, which is a Power-Factor Converter (PFC). PFC 10 generates a Direct Current (DC) link voltage between the first stage and the second stage. The second stage is an isolated DC-DC converter 12. DC-DC converter 12 receives the DC link voltage from PFC 10 and generates the output voltage that charges the battery. For example, PFC 10 can generate an 800-volt DC link voltage that is used by DC-DC converter 12 to charge a battery on its output from 200 volts (v) initially to 750v when the battery is fully charged. DC-DC converter 12 can be a Dual Active Bridge (DAB), an LLC converter, a CLLLC converter, or a Phase-Shifted Full Bridge (PSFB) converter, as a few examples.

The two-stage power converter of FIG. 1 may reside inside an EV or may reside in an EV charger or charging station. Various bypasses may be used, such as by applying the DC output from an EV charger to the EV battery, bypassing the EV's on-board two-stage power converter, or bypassing the PFC stage.

The time to charge an EV can be reduced by using a higher charging power having a higher charging current or charging voltage. The EV's batteries may be charged over a wide voltage range for high-speed charging. Charging over a wide voltage range can reduce efficiencies, especially at lower battery (output) voltages where circulation currents are relatively large, resulting in high conduction losses. Also at low output voltages, charging current and power may need to be reduced to prevent over-heating of components such as semiconductors and transformers. Reducing charging current and power at low output voltages can increase charging time.

The DC link voltage between stages may be a fixed voltage, or may be a function of the AC input voltage to PFC 10 or a function of the battery voltage. The DC link voltage may also be variable. Since the DC link voltage is generated by first stage PFC 10, while the output voltage is generated by second-stage DC-DC converter 12, first-stage control is often isolated from the output of the second stage. Since DC-DC converter 12 has both primary-side and secondary-side transistors, second-stage control is often complex.

What is desired is a controller for a two-stage power converter. It is desired to control the first stage to generate a DC link voltage that varies with output conditions of the second stage. A two-stage power converter that varies the DC link voltage to improve charging efficiency, especially a low output voltages, is desired. A second-stage controller that uses phase-shift modulation to control the output current, voltage, and power is desirable with a variable DC link voltage that is varied by the first-stage controller.

DETAILED DESCRIPTION

The present invention relates to an improvement in controllers of two-stage power converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
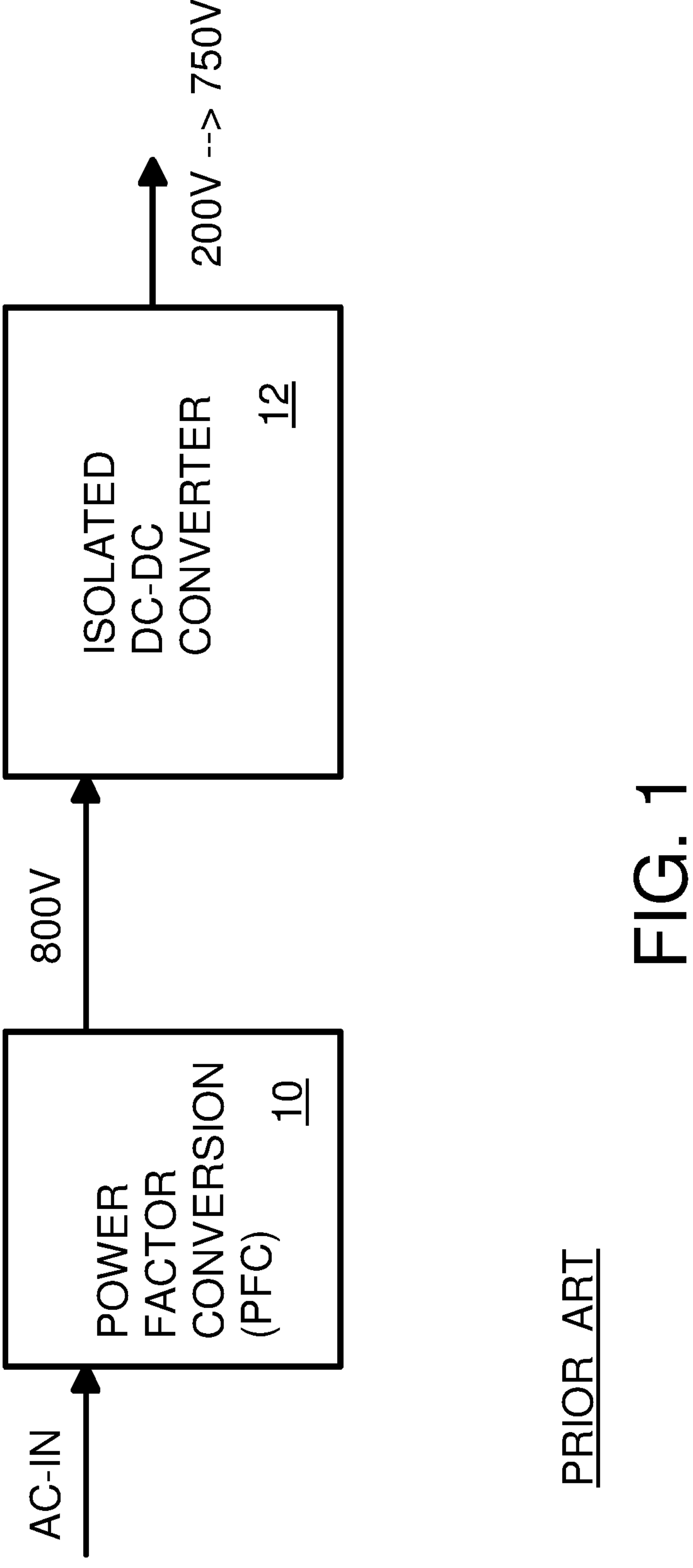
FIG. 1 shows a prior-art two-stage power converter for charging an EV battery.
Figure 2:
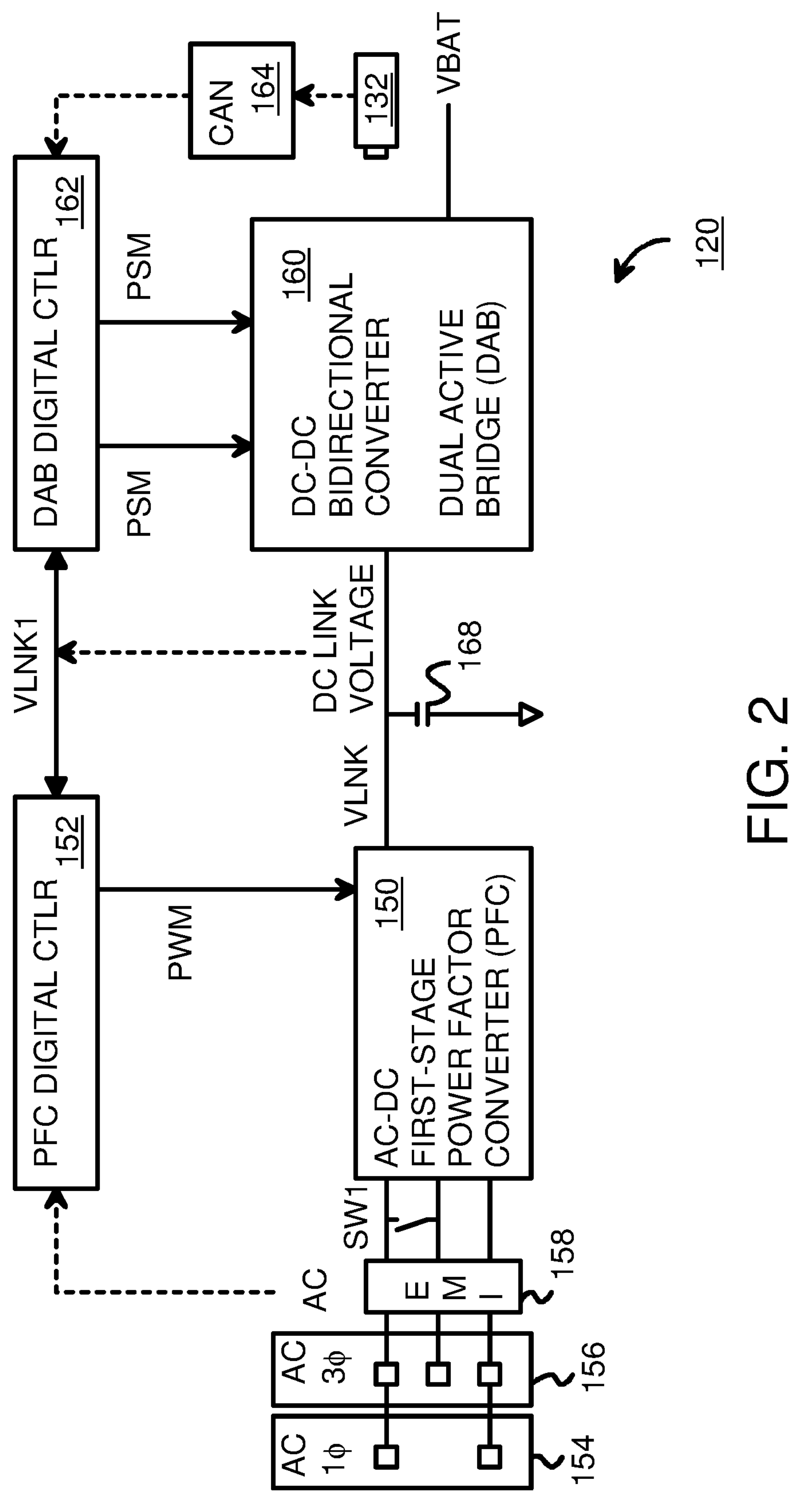
FIG. 2 is a diagram of a two-stage converter.

FIG. 2 is a diagram of a two-stage converter. Two-stage converter 120 has an AC front end and a DC back end. The AC port connects an AC input voltage to an AC-DC first stage converter, Power-Factor Converter (PFC) 150, while the second-stage DC-DC bidirectional converter, Dual Active Bridge (DAB) converter 160, drives battery voltage VBAT onto a DC output port that charges primary battery 132. PFC 150 and DAB converter 160 are connected together by a DC link voltage VLNK that is generated on link capacitor 168.

DAB converter 160 can operate in a reverse direction mode to discharge primary battery 132 to provide auxiliary power to VLNK or to an auxiliary DC port (not shown). PFC 150 can also operate in a reverse direction mode to provide power to the single-phase or three-phase AC grid from VLNK.

The AC port can be plugged in to either standard one-phase AC plug 154, or into three-phase AC plug 156. The standard AC has one AC sine wave on two wires (P, N), while the 3-phase AC has three AC sine waves, separated by a 120-degree phase, on three wire inputs A, B, C. Most home AC is single phase, but superchargers located at office and commercial buildings have access to three-phase AC, which is used to power commercial-grade air conditioning and lighting units.

The P and A inputs of one-phase AC plug 154 and three-phase AC plug 156 are shorted together and applied to PFC 150. Likewise, the N and C inputs of one-phase AC plug 154 and three-phase AC plug 156 are shorted together and applied to PFC 150. The middle B input from three-phase AC plug 156 is input to PFC 150 without any connection to one-phase AC plug 154. However, when one-phase AC plug 154 is used and three-phase AC plug 156 is not used, such as at a home installation, switch SW1 shorts upper input A/P to middle input B, so that the upper and middle AC inputs to PFC 150 are shorted together by switch SW1.

When one-phase AC plug 154 is not used but three-phase AC plug 156 is used, such as at a commercial supercharger installation, switch SW1 is open, isolating upper input A(P) from middle input B, so that the upper and middle AC inputs to PFC 150 are isolated by switch SW1. PFC 150 then receives all three A, B, C inputs from three-phase AC plug 156. Electro-Magnetic Interference (EMI) filter 158 is connected to the A, B, and C inputs to filter noise such as unwanted harmonics on the AC input.

PFC digital controller 152 generates Pulse-Width-Modulated (PWM) control signals to the gates of transistors within PFC 150 to control the direction, voltages, and power-factor correction of the AC-DC or DC-AC (reverse) conversion performed by PFC 150. Similarly, DAB digital controller 162 generates Phase-Shift Modulation (PSM) control signals to the gates of transistors within DAB converter 160 to control the direction, voltages, and other conversion properties of the DC-DC conversion performed by DAB converter 160. PSM control signals are generated for the primary side and for the secondary side of DAB converter 160.

PFC digital controller 152 senses the voltages and currents on the AC inputs to determine whether 1-phase or 3-phase AC is present. Controller Area Network (CAN) monitor 164 monitors the status of primary battery 132 and reports battery status to DAB digital controller 162. A bus between PFC digital controller 152 and DAB digital controller 162, such as a RS485 bus, can be used for inter-controller communication. The DC link voltage on link capacitor 168 is also monitored by PFC digital controller 152 and DAB digital controller 162.

Figure 3:
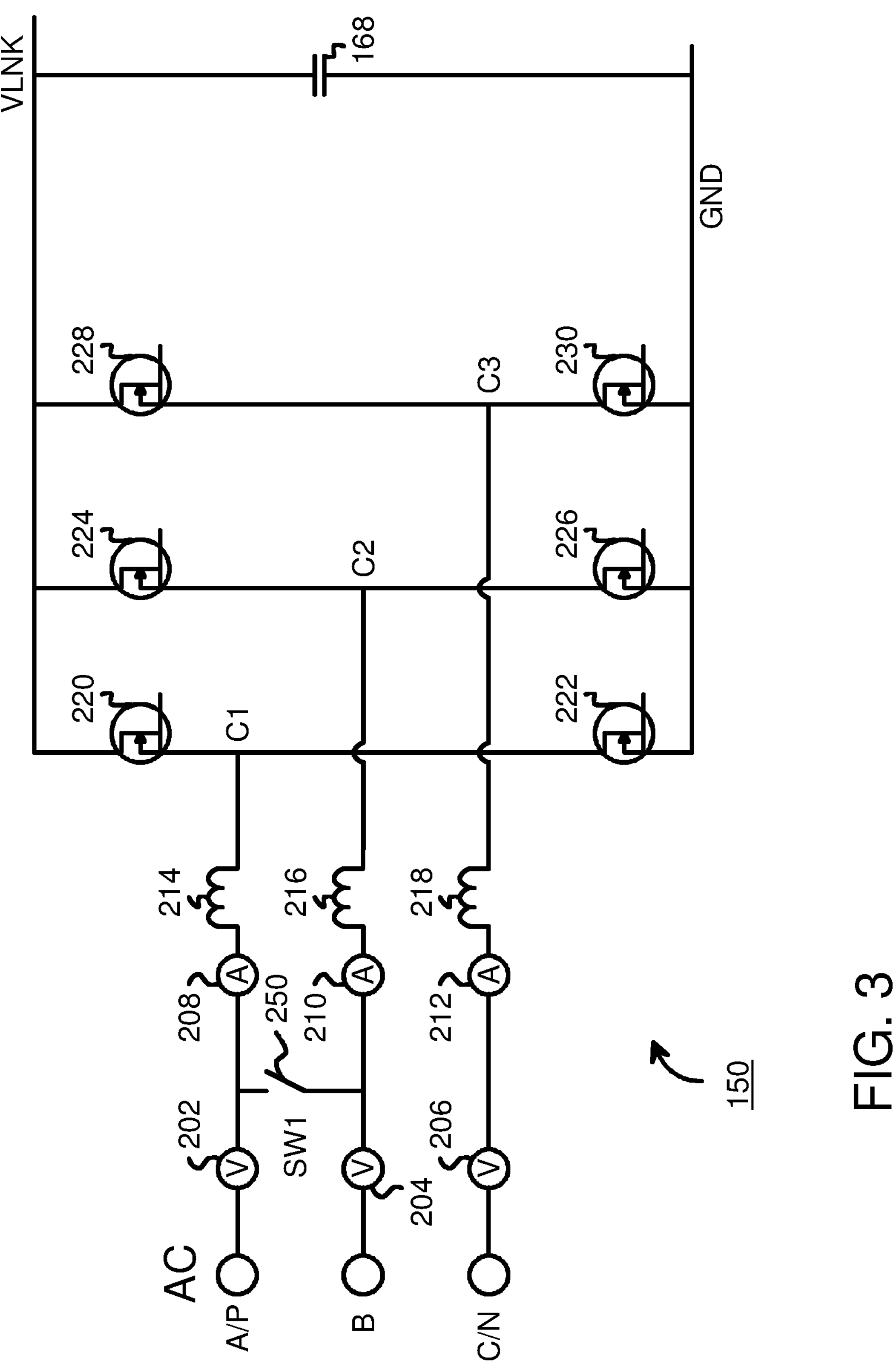
FIG. 3 is a schematic of the PFC first stage converter.

FIG. 3 is a schematic of the PFC first stage converter. Voltage sensors 202, 204, 206 sense the voltages on the A(P) B, and C(N) AC inputs, respectively, while current sensors 208, 210, 212 sense the respective currents flowing on these lines. Inductors 214, 216, 218 are series inductors to step up the VLNK voltage and to reduce current ripple on the AC inputs.

Switch SW1 250 is open for three-phase AC and closed for one-phase AC. Switch 250 shorts AC input B to AC input A/P when one-phase AC is applied and three-phase AC is not available.

When connected to a single-phase AC grid, switch SW1 250 is closed. Transistors 220, 222, 224, 226 operate at a fast switching frequency, such as 30-60 KHz, while transistors 228, 230 operate at a slower AC-line frequency (50 Hz or 60 Hz). Transistors 220, 222 form a fast switching bridge with complementary PWM drive signals applied to their gates. Transistors 224, 226 form another fast switching bridge with complementary PWM drive signals applied to their gates. The gate of pull-up transistor 220 is driven by a PWM drive signal that is 180 degrees out of phase with the PWM drive signal applied to the gate of pull-up transistor 224. Similarly, the PWM drive signal applied to the gate of pull-down transistor 222 is delayed in phase by 180 degrees compared with the PWM drive signal applied to the gate of pull-down transistor 226. This 180-degree phase difference causes the currents through transistors 220, 222 to be interleaved with transistors 224, 226. This interleaved operation can reduce the AC ripple current.

Transistors 228, 230 form a line frequency bridge. When the AC input voltage is in the positive part of its cycle, transistor 230 is constantly turned on, and transistor 228 is constantly turned off. When AC input voltage is in its negative part of the AC cycle, transistor 228 is constantly turned on, and transistor 230 is constantly turned off. PFC digital controller 152 generates the PWM control signals to transistors 220, 222, 224, 226 that switch at the higher switching frequency, and generate the PWM control signals to transistors 228, 230 that switch at the slower AC line frequency. PFC digital controller 152 controls PFC 150 to operate as an interleaving totem pole power factor correction control, using the control loop shown later in FIG. 6A-6C.

When a three-phase AC grid is connected, switch SW1 250 is open. Transistors 220, 222 form one fast switching bridge for the A/P input. The gates of transistors 220, 222 receive complementary PWM driving signals. Transistors 224, 226 form another fast switching bridge, but this bridge is for the B input. The gates of transistors 224, 226 receive complementary PWM driving signals. Transistors 228, 230 form another fast switching bridge. This bridge is for the C/N input. The gates of transistors 228, 230 receive complementary PWM driving signals.

PFC digital controller 152 controls PFC 150 to operate with three-phase power factor correction using space vector PWM driving signals for transistors 220, 222, 224, 226, 228, 230.

For one-phase mode, the timing of the PWM control signals generated by PFC digital controller 152 is altered. Since the A and B AC inputs are shorted together by switch SW1, the PWM signal applied to the gates of pull-up transistor 220 and pull-down transistor 222 are 180-degrees out of phase with the PWM signals applied to the gates of pull-up transistor 224 and pull-down transistor 226, respectively. This 180-degree phase shift provides an interleaving effect. The PWM signals applied to the gate of pull-up transistor 228 and to pull-down transistor 230 has the power-line frequency, such as 50 Hz or 60 Hz. The PWM signals to the gates of transistors 220, 222, 224, 226 operate at a higher switching frequency, such as 30-60 KHz.

When the AC input is one-phase, PFC 150 operates as an interleaving totem pole Power Factor Correction (PFC) converter. Pull-up transistor 220 is interleaved with transistor 224, and transistor 222 is interleaved with transistor 226, since their control gates are drive with PWM signals that are 180-degrees out of phase with each other. When operating from a three-phase AC input, three-phase power factor correction is provided by PFC 150 using a so-called B6 topology with switch SW1 open. Either one-phase or three-phase AC input can operate with low AC input harmonics and a high power factor by implementing control mode through PFC digital controller 152.

The rectified AC voltage from PFC 150 is filtered by link capacitor 168 to generate the DC link voltage VLNK. DAB converter 160 receives VLNK as its input voltage as input current is supplied by link capacitor 168.

Figure 4:
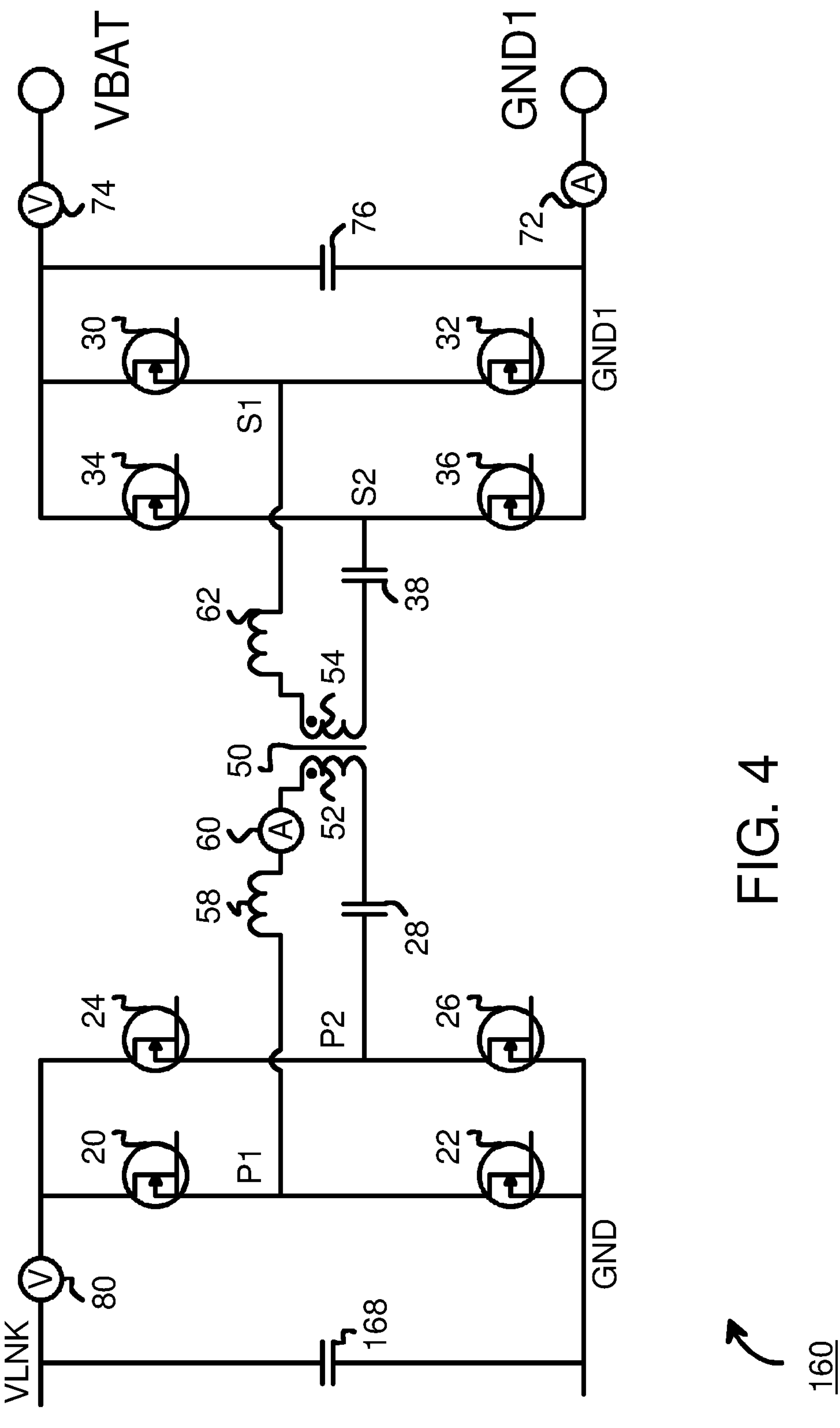
FIG. 4 is a schematic of the second-stage DAB converter.

FIG. 4 is a schematic of the second-stage DAB converter. Transformer 50 isolates voltages and currents on the primary side that flow through primary windings 52 from the currents in the secondary side flowing through secondary windings 54. Transformer 50 inductively couples secondary windings 54 to primary windings 52.

The rectified AC voltage from PFC 150 is filtered by link capacitor 168 to generate the DC link voltage VLNK that is sensed by voltage sensor 80. The DC link voltage and ground GND are connected to a full bridge of transistors 20, 22, 24, 26. The midpoint of the bridge between transistors 20, 22, node P1, is connected in series with inductor 58 and primary windings 52. The current flowing through primary windings 52 is measured by current sensor 60. This AC current through primary windings 52 then flows through capacitor 28 to the second interior node P2 of the bridge, between transistors 24, 26.

The gates of transistors 20, 22, 24, 26 are controlled by DAB digital controller 162. These gates can be driven by Phase-Shift-Modulation (PSM) signals. These PSM drive signals have a fixed high frequency (e.g. 50 KHz-200 KHz) with a fixed pulse duty cycle around 50%. The PSM control signal applied to the gate of transistor 22 is complementary to the control signal applied to the gate of transistor 20. Likewise, the PSM control signal applied to the gate of transistor 24 is complementary to the control signal applied to the gate of transistor 26.

DAB converter 160 also has a secondary side bridge of transistors 30, 32, 34, 36 that also have gates driven by PSM signals from DAB digital controller 162. The gates of transistors 30, 32, 34, 36 are controlled by DAB digital controller 162. These gates can be driven by PSM signals having a fixed high frequency with a fixed pulse duty cycle around 50%. The PSM control signal applied to the gate of transistor 30 is complementary to the control signal applied to the gate of transistor 32. Likewise, the PSM control signal applied to the gate of transistor 34 is complementary to the control signal applied to the gate of transistor 36.

The interior bridge node 51 between transistors 30, 32 and the other interior bridge node S2 between transistors 34, 36 are connected together by a loop that includes inductor 62, secondary windings 54, and capacitor 38 in series. The output of this secondary side bridge charges capacitor 76 and drives the DC output port, with the VBAT voltage measured by voltage sensor 74 and the DC1 current measured by current sensor 72 on the return from the secondary ground GND1.

DAB converter 160 acts as a CLLLC resonant tank for a power converter, where C represents a capacitor and L represents an inductor. Capacitors 28, 38 in the primary side bridge and the secondary side bridge, respectively, are connected by inductors 58, 62 in the primary and secondary sides, respectively, and the magnetic inductance of transformer 50. This is a CLLLC structure with three inductors in series between the end capacitors. The frequency of the PSM signals applied to the gates of transistors 20, 22, 24, 26 can be selected to achieve a desired controllable DC current gain from the DC link voltage VLNK to the DC output port VBAT, and to achieve the resonant frequency of the CLLLC tank.

Four complementarily switch-pairs of PSM signals are applied to transistors 20 and 22, 24 and 26, 30 and 32, 34 and 36. A primary high-frequency pulse-width modulated three-level AC voltage is generated across P1 and P2 since the gate of transistor 20 is driven by a PSM drive signal that is phased shifted with the PSM drive signal applied to the gate of transistor 24. Likewise, a second high-frequency pulse-width modulated three-level AC voltage is generated across S1 and S2 since the gate of transistor 30 is driven by a PSM drive signal that is phased shifted with the PSM drive signal applied to the gate of transistor 34. When operating in the forward direction, the second high-frequency AC voltage is leading the primary high-frequency AC voltage. When operating in the reverse direction, the second high-frequency AC voltage is lagging the primary high-frequency AC voltage The switching frequency of the PSM control signals applied to the transistor gates is fixed, with peak conversion efficiency occurring when the switching frequency matches the CLLLC resonant frequency.

Figure 5:
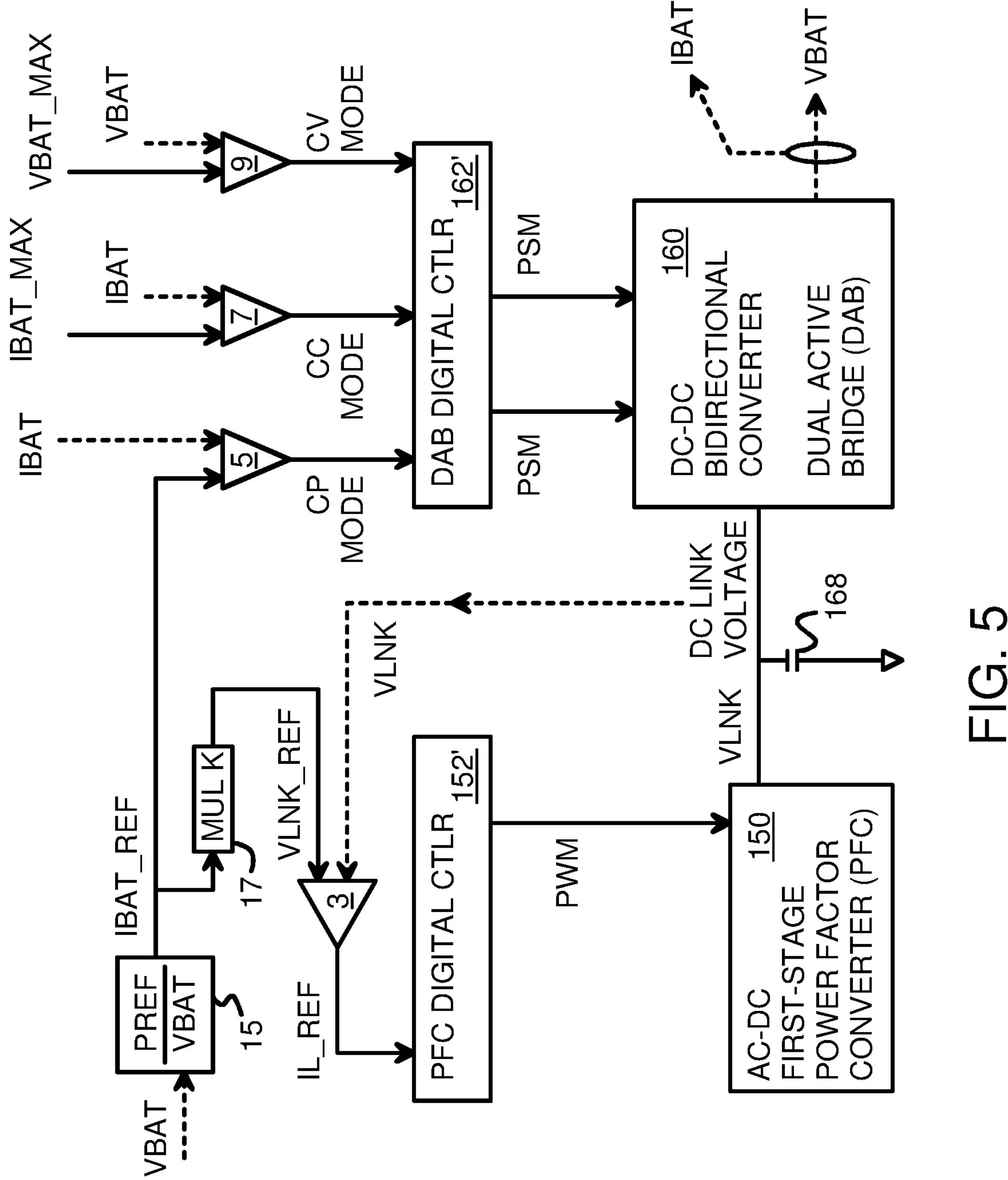
FIG. 5 highlights variable-link control of the two-stage power converter.

FIG. 5 highlights variable-link control of the two-stage power converter. The output of DAB converter 160 drives the battery being charged and the output voltage is sensed as VBAT and the output battery current sensed as IBAT. The DC link voltage VLNK on link capacitor 168 between PFC 150 and DAB converter 160 is also sensed as VLNK. These three variables, VLNK, VBAT, and IBAT, are used to control the two-stage converter.

The sensed VLNK is compared to link reference VLNK_REF by comparator 3 to generate current reference IL_REF. Current reference IL_REF causes PFC digital controller 152' to adjust the PWM control signals to PFC 150 to increase or decrease VLNK until VLNK matches VLNK_REF.

VLNK_REF is not constant but is a function of the output or battery voltage VBAT. Divider 15 divides a reference power PREF by VBAT to get the battery current reference IBAT_REF. Multiplier 17 multiplies battery current reference IBAT_REF by a constant K to generate VLNK_REF to comparator 3. Thus the DC link voltages VLNK is adjusted by PFC digital controller 152' and PFC 150 to equal IBAT_REF*K, or $$VLNK = \text{IBAT\_REF} * K$$

or $$VLNK = (PREF/VBAT) * K$$

PREF and K are constants or pre-set values, so VLNK is a function of VBAT. As VBAT rises as the battery is charged during CP mode, VLNK decreases. However, when VLNK is at the maximum VLNK_MAX during CC mode, VLNK is not adjusted as VBAT rises.

The second stage, DAB converter 160, can operate in CP, CC, or CV modes. During CP mode, IBAT_REF from divider 15 is compared to the sensed battery current IBAT by comparator 5 to cause DAB digital controller 162' to adjust the duty ratio and phase difference of the PSM control signals to the primary-side and secondary-side transistors in DAB converter 160 until IBAT matches IBAT_REF. Since IBAT_REF varies with VBAT due to divider 15, the output battery current IBAT from DAB converter 160 is reduced as output battery voltage VBAT rises, keeping output power relatively constant at the target PREF.

During CC mode, a pre-set battery-current limit IBAT_MAX is compared to the sensed battery current IBAT by comparator 7 to cause DAB digital controller 162' to adjust the duty ratio and phase difference of the PSM control signals to the primary-side and secondary-side transistors in DAB converter 160 until IBAT matches IBAT_MAX. Thus the output battery current is held relatively constant during CC mode.

During CV mode, a pre-set battery-voltage limit VBAT_MAX is compared to the sensed battery voltage VBAT by comparator 9 to cause DAB digital controller 162' to adjust the duty ratio and phase difference of the PSM control signals to the primary-side and secondary-side transistors in DAB converter 160 until VBAT matches VBAT_MAX. Thus the output battery voltage is held relatively constant during CV mode.

Figure 6A:
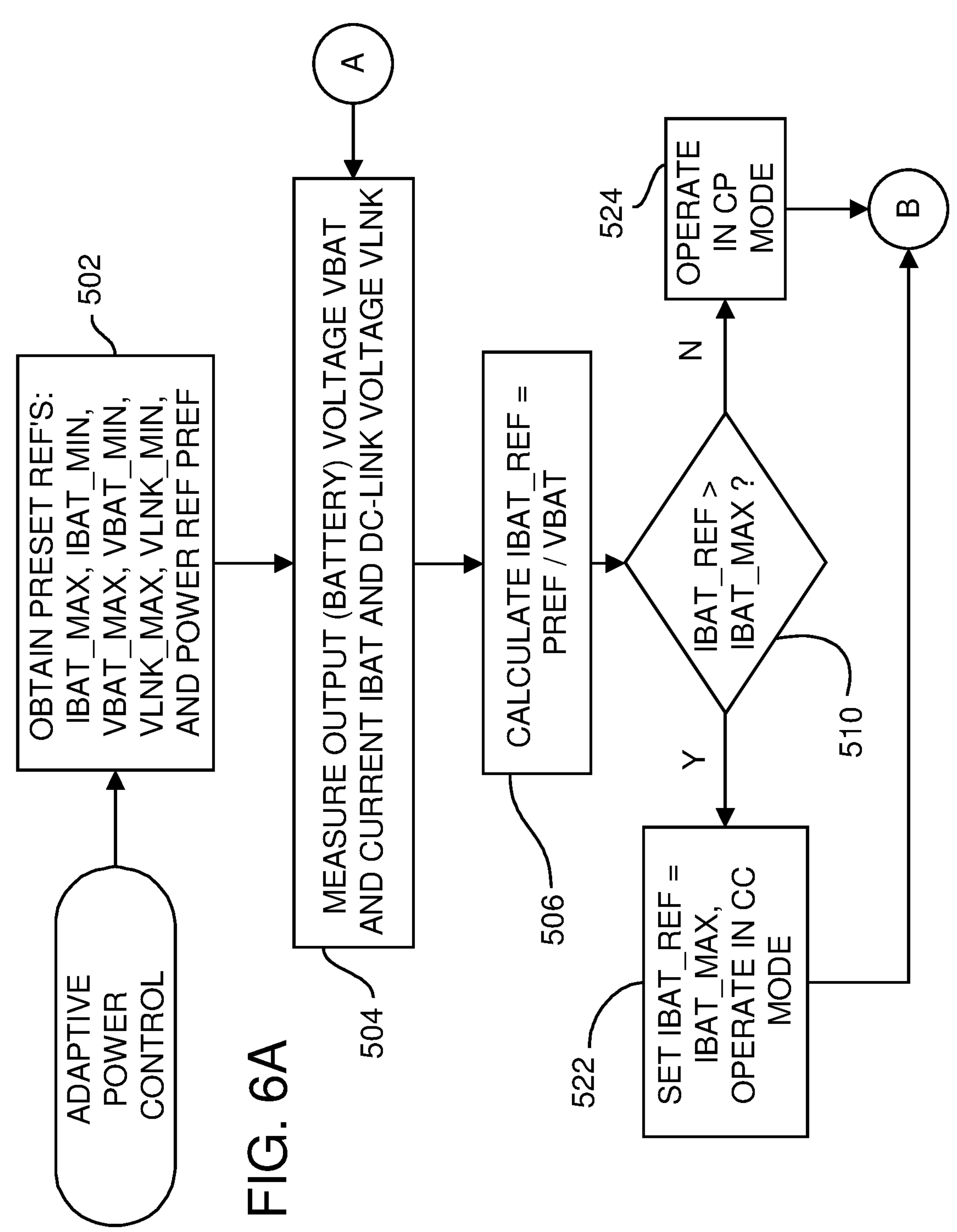
FIGS. 6A-6C show a flowchart of a variable-link adaptive power control routine to control the two-stage converter.
Figure 6B:
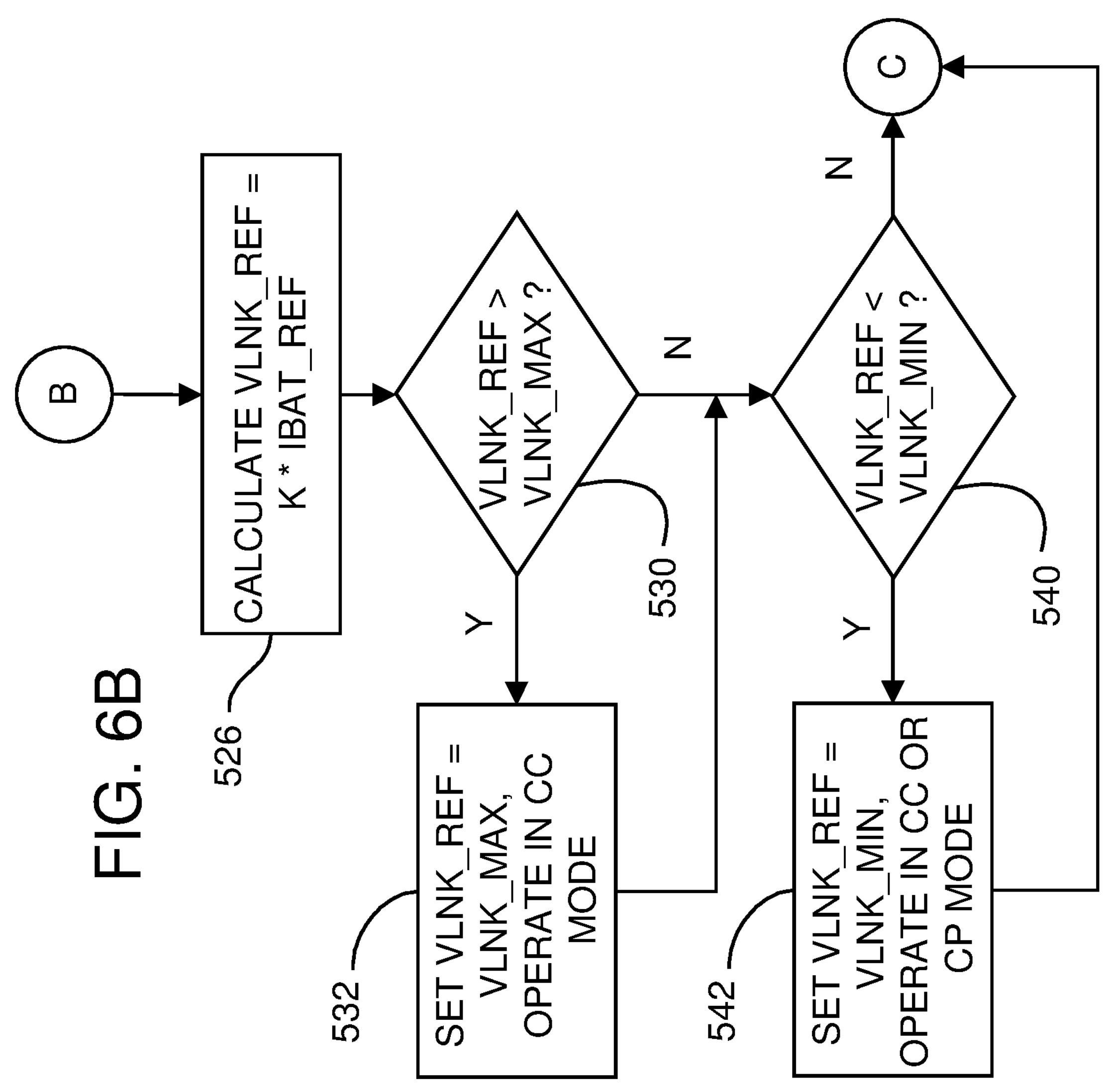
Figure 6C:
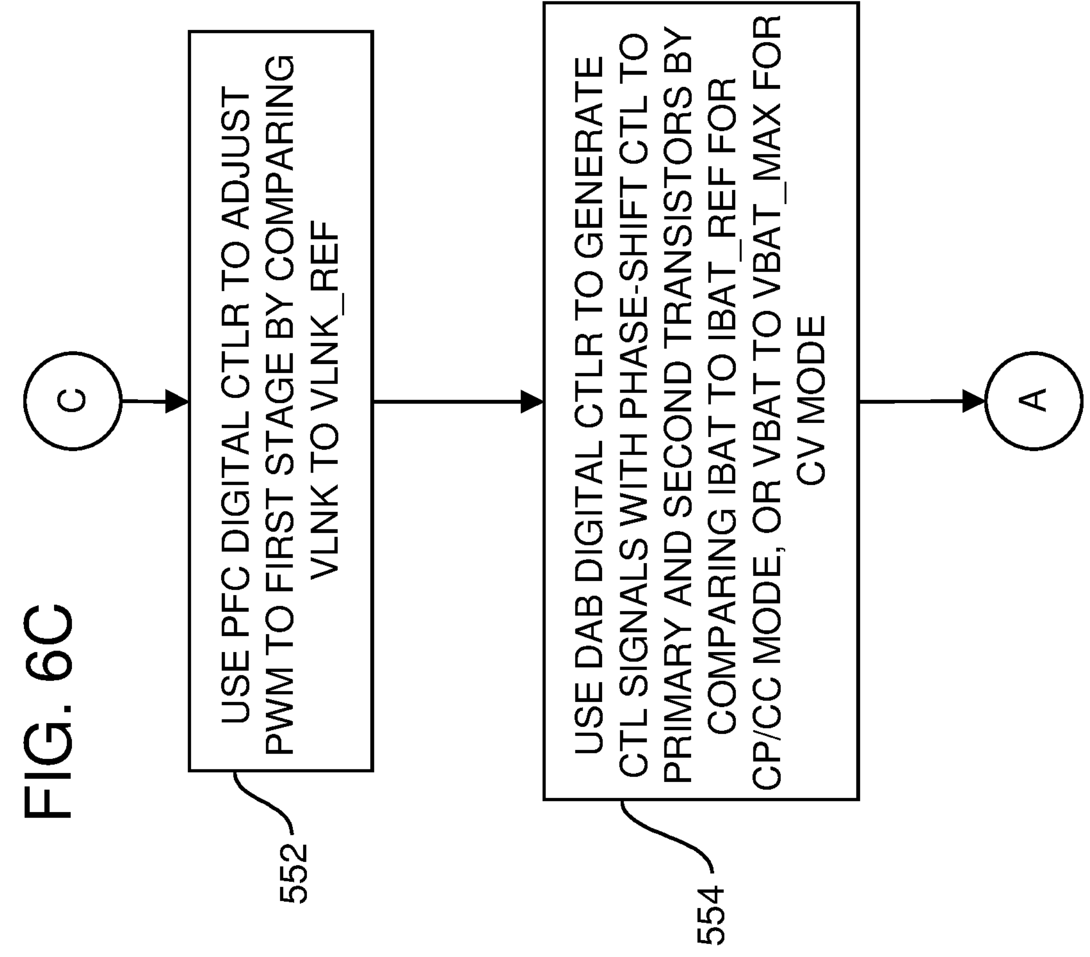

FIGS. 6A-6C show a flowchart of a variable-link adaptive power control routine to control the two-stage converter. This routine can be implemented in the hardware and/or firmware of PFC digital controller 152 and DAB digital controller 162.

In FIG. 6A, preset constants are obtained, step 502, such as by reading a memory device or register, or by being hardwired into the logic. These presets include the maximum battery current limit IBAT_MAX, minimum battery current limit IBAT_MIN, the maximum battery voltage limit VBAT_MAX, minimum battery voltage limit VBAT_MIN, the maximum DC link voltage limit VLNK_MAX, the minimum DC link voltage limit VLNK_MIN, and the target or reference power PREF.

The three variables are measured or sensed, step 504, including the output battery voltage VBAT and current IBAT, and the DC link voltage VLNK. The battery reference current IBAT_REF is calculated as PREF/VBAT, step 506. When this computed IBAT_REF is less than or equal to the battery current limit IBAT_MAX, step 510, then CP mode is used, step 524. CP mode usually provides faster charging than CC or CV modes.

When the computed IBAT_REF is greater than to the battery current limit IBAT_MAX, step 510, then CC mode is used, step 522. The battery reference current IBAT_REF is reduced to the current limit IBAT_MAX.

In FIG. 6B, the DC link reference VLNK_REF is calculated as K*IBAT_REF, step 526, where IBAT_REF was limited to IBAT_MAX for CC mode by step 522, or is PREF/VBAT for CP mode, steps 506, 524. When the calculated VLNK_REF is greater than the maximum link voltage limit VLNK_MAX, step 530, then VLNK_REF is reduced to VLNK_MAX, step 532, and charging uses CC mode.

The constant-current CC mode rather than the faster-charging CP mode is used when the DC link reference voltage exceeds the maximum, steps 530, 532, or when the battery current reference exceeds the maximum, steps 510, 522. When these maximums are not exceeded, then constant power CP mode can be used for faster charging.

When the calculated VLNK_REF is less than the minimum link voltage limit VLNK_MIN, step 540, then VLNK_REF is raised to the minimum VLNK_MIN, step 542. Charging can still use either CP or CC mode.

In FIG. 6C, in step 552 the sensed VLNK is compared to the calculated VLNK_REF to adjust the duty cycle of the PWM control signals generated by PFC digital controller 152 to PFC 150.

In step 554, IBAT is compared to IBAT_REF for CP mode, or to IBAT_MAX for CC mode, or VBAT is compared to VBAT_MAX for CV mode, to adjust the duty cycle ratio and phase shift between the primary and secondary PSM control signals that are generated by DAB digital controller 162 and driven to primary and secondary transistors in DAB converter 160.

Steps 552 and 554 may be performed many times in parallel before looping back to step 504 when new measurements of VLNK, IBAT, or VBAT are taken. Then IBAT_REF and VLNK_REF are recalculated. The targets for IBAT, VBAT, and VLNK are then shifted based on the new measurements of IBAT, VBAT, and VLNK. Once the battery is fully charged the process can be terminated (not shown).

Figure 7:
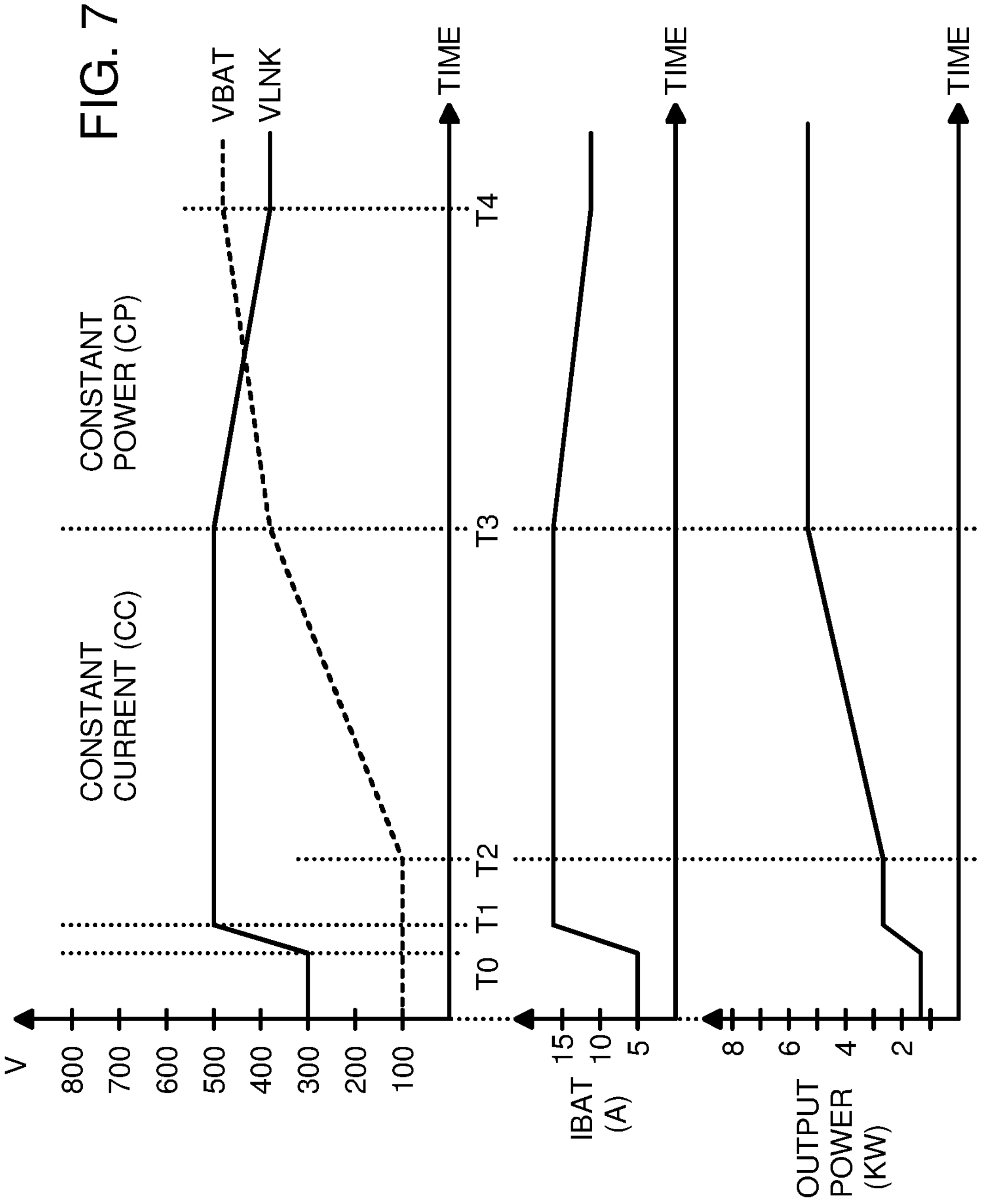
FIG. 7 shows waveforms of CC and CP charging modes using the two-stage power converter.

FIG. 7 shows waveforms of CC and CP charging modes using the two-stage power converter. At time T0 two-stage converter 120 is activated and PFC 150 rapidly drives VLNK to higher voltages as VLNK is raised from 300v at time T0 to 500v at time T1. Battery current IBAT and output power to the battery rise quickly as DAB converter 160 uses the rising VLNK to drive more current and power to the battery.

At time T1 the maximum current limit IBAT_MAX is reached, and current from DAB converter 160 is limited to IBAT_REF=IBAT_MAX, so IBAT remains constant. CC mode begins at time T1 and extends to time T3.

At time T2 VBAT begins to noticeably rise as the charging current IBAT charges the external battery. As VBAT rises while IBAT is constant, the output power also rises, since power=IBAT*VBAT.

The DC link voltage VLNK is kept constant during CC mode since IBAT_REF is limited and not a function of VBAT (steps 522, 506 FIG. 6A).

At time T3 VBAT has risen enough that IBAT_REF=PREF/VBAT is now less than IBAT_MAX (FIG. 6A steps 506, 510, 524), so CC mode ends and CP mode starts. The output power remains constant during CP mode, but IBAT is reduced as VBAT rises with the charging battery to maintain a constant power (IBAT*VBAT). As VBAT rises during CP mode, IBAT_REF=PREF/VBAT falls, and VLNK_REF=K*IBAT_REF also falls, allowing VLNK to fall during CP mode. See FIG. 6B step 526 and FIG. 6A step 506.

Finally at time T4, the battery is almost fully charged and VBAT no longer rises, so VLNK and IBAT remain constant. IBAT can be a trickle charge once the battery is fully charged, or charging can be shut off.

Figure 8B:
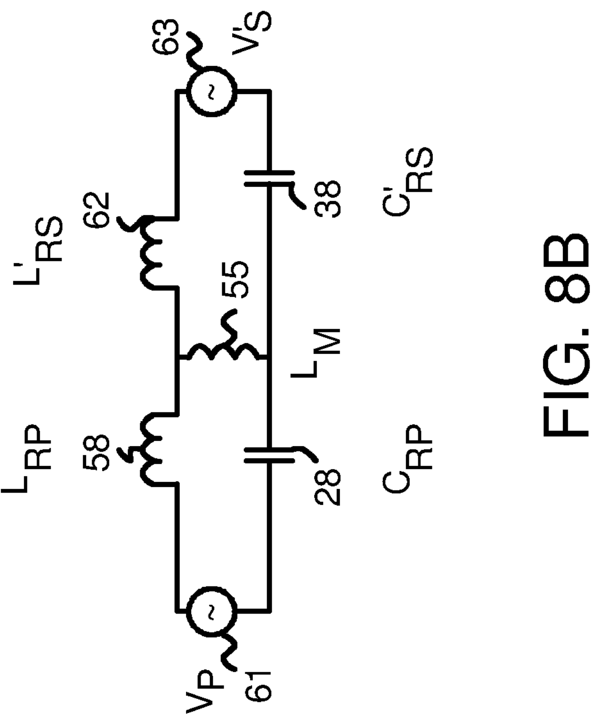
FIGS. 8A-8B show circuit models of the DAB converter.
Figure 8A:
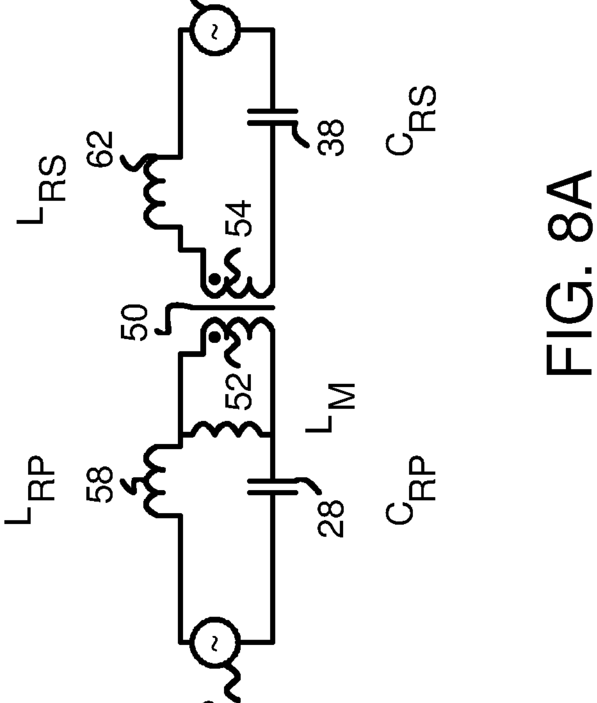

FIGS. 8A-8B show circuit models of the DAB converter. FIG. 8A shows a First Harmonic Approximation (FHA) model of DAB converter 160. Transformer 50 isolates voltages and currents on the primary side that flow through primary windings 52 from the currents in the secondary side flowing through secondary windings 54. Transformer 50 inductively couples secondary windings 54 to primary windings 52.

Primary voltage source 61 is the voltage generated by primary transistors 20, 22 and 24, 26 in DAB converter 160. The midpoint of the bridge between transistors 20, 22, node P1, is connected in series with inductor 58 and primary windings 52. This AC current through primary windings 52 then flows through capacitor 28 to the second interior node P2 of the bridge, between transistors 24, 26.

Secondary voltage source 63 is the voltage generated by secondary transistors 30, 32, 34, 36. Secondary voltage source 63 is connected by a loop that includes inductor 62, secondary windings 54, and capacitor 38 in series.

DAB converter 160 acts as a CLLLC resonant tank for a power converter, where C represents a capacitor and L represents an inductor. Capacitors 28, 38 in the primary side bridge and the secondary side bridge, respectively, are connected by inductors 58, 62 in the primary and secondary sides, respectively, and the magnetic inductance of transformer 50. This is a CLLLC structure with three inductors in series between the end capacitors.

FIG. 8B is a simplified model of the DAB converter. Inductor 55 models transformer 50. Parameters are referred to the primary side, so the values of inductor 62 and capacitor 38 are adjusted.

The power transfer through DAB converter 160 can be calculated as:

$$P = \frac{8n * VLNK * VBAT}{\pi^2 |Z_m|} \times M$$

where Zm is the equivalent impedance of the simplified model of FIG. 8B, and n is the turns ratio N1/N2, where N1 is the number of turns in primary windings 52 and N2 is the number of turns in secondary windings 54.

M is the modulation factor:

$$M = \sin\frac{\alpha_p}{2}\sin\frac{\alpha_s}{2}\sin\theta$$

where $\alpha_p$ is the primary-side duty cycle and $\alpha_s$ is the secondary-side duty cycle and θ is the phase difference between the primary and secondary. M is between 0 and 1. The higher the modulation factor M, the higher the output power.

Figure 9:
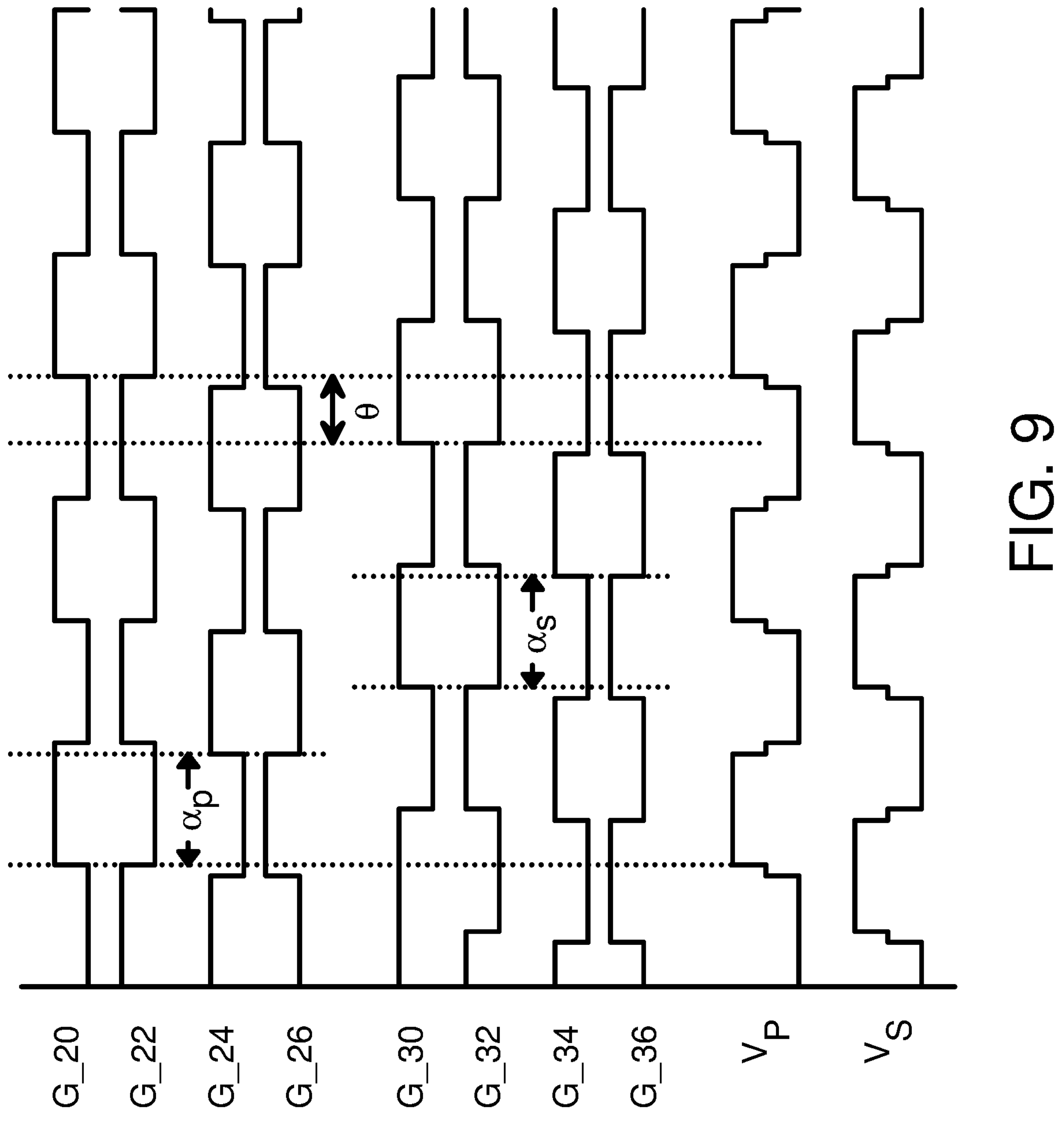
FIG. 9 is a waveform diagram of PSM control signals to the primary and secondary transistors in the DAB converter.

FIG. 9 is a waveform diagram of PSM control signals to the primary and secondary transistors in the DAB converter. The PSM control signals to the gates of primary-side transistors 20, 22, 24, 26 are G_20, G_22, G_24, and G_26, respectively that generate primary voltage Vp. The PSM control signals to the gates of secondary-side transistors 30, 32, 34, 36 are G_30, G_32, G_34, and G_36, respectively, that generate secondary voltage Vs.

The PSM signals to the gate of transistor 20, G_20, is delayed by $\alpha_p$ to obtain G_24 to the gate of transistor 24. G_22 is the inverse of G_20 and G_26 is the inverse of G 24.

The PSM signals to the gate of transistor 20, G_20, is delayed by −0 to obtain G_30 to the gate of transistor 30. The PSM signals to the gate of transistor 30, G_30, is delayed by $\alpha_s$ to obtain G_34 to the gate of transistor 34. G_32 is the inverse of G_30 and G_36 is the inverse of G_34.

Figure 10:
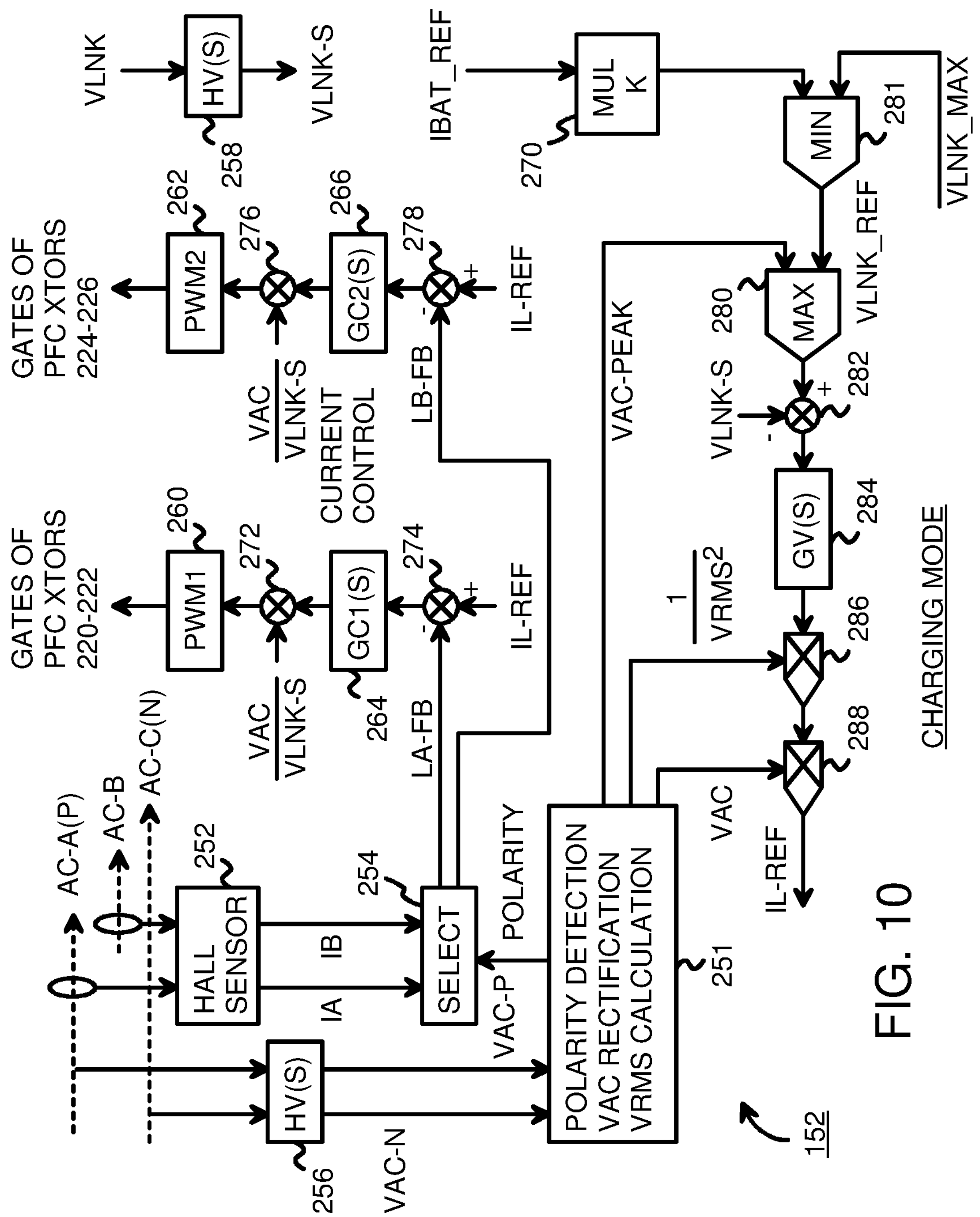
FIG. 10 is a diagram of the first-stage PFC digital controller when configured for a charging mode with totem-pole power-factor correction.

FIG. 10 is a diagram of the first-stage PFC digital controller when configured for a charging mode with totem-pole power-factor correction. Charging mode in this example is when primary battery 132 is being charged from AC.

Rather than have a constant DC link voltage, the DC link voltage VLNK is allowed to fall as the battery voltage is increasing during Constant-Power (CP) mode. DAB digital controller 162 uses DC-link adaptive control to reduce the circulating current in transistors in DAB 160 and to improve efficiency compared to having a fixed DC link voltage.

PFC digital controller 152 obtains the reference battery current IBAT_REF of primary battery 132 from minimizer 331 in DAB digital controller 162 and uses the reference battery current IBAT_REF to adjust the PWM control signals. Reference battery current IBAT_REF is multiplied by the constant K by multiplier 270 and input to minimizer 281 that passes the product IBAT_REF*K through as VLNK_REF when smaller than the maximum link voltage VLNK_MAX.

The minimum from minimizer 281, VLNK_REF, is a reference battery voltage for the whole control loop. This reference battery voltage is compared to the peak AC voltage, VAC-PEAK, and the maximum of VLNK_REF and VAC-PEAK is selected by maximum selector 280.

DC link voltage VLNK is sampled by voltage sampler 258 to generate VLNK-S, which is subtracted by adder 282 from the maximum voltage selected by maximum selector 280. Proportional-Integrator (PI) 284 integrates the sum from adder 282, which is then multiplied in multiplier 286 by the reciprocal of the square of the Root-Mean-Square (RMS) AC voltage, and then multiplied in multiplier 288 by the current AC voltage, VAC, to generate current reference IL-REF.

The current flowing through the A and B AC lines are sensed by hall sensor 252 as currents IA and IB, respectively. The AC voltages of the A and C lines are sensed by voltage sensor 256 as VAC-P and VAC-N, respectively. Polarity detector and calculator 251 rectifies VAC and calculates VRMS and also generates a polarity signal that causes selector 254 to select IA or IB to generate LA-FB and LB-FB.

This LA-FB current from selector 254 is subtracted from the reference current IL-REF by adder 274, then integrated by Proportional-Integrator (PI) 264 and multiplied by VAC/(VLNK-S) by multiplier 272 to control the pulse width or duty cycle of the control signals to the gates of pull-up transistor 220 and pull-down transistor 222 that are generated by PWM controller 260.

The LB-FB current from selector 254 is subtracted from the reference current IL-REF by adder 278, then integrated by Proportional-Integrator (PI) 266 and multiplied by VAC/(VLNK-S) by multiplier 276 to control the pulse width of the control signals to the gates of pull-up transistor 224 and pull-down transistor 226 that are generated by PWM controller 262.

The PWM control signals to the gates of pull-up transistor 228 and pull-down transistor 230 are generated by another PWM controller (not shown) to have a switching frequency equal to the AC input frequency, such as 50 Hz or 60 Hz for single-phase AC operation. For three-phase AC operation, space-vector PWM control signals are generated.

Figure 11:
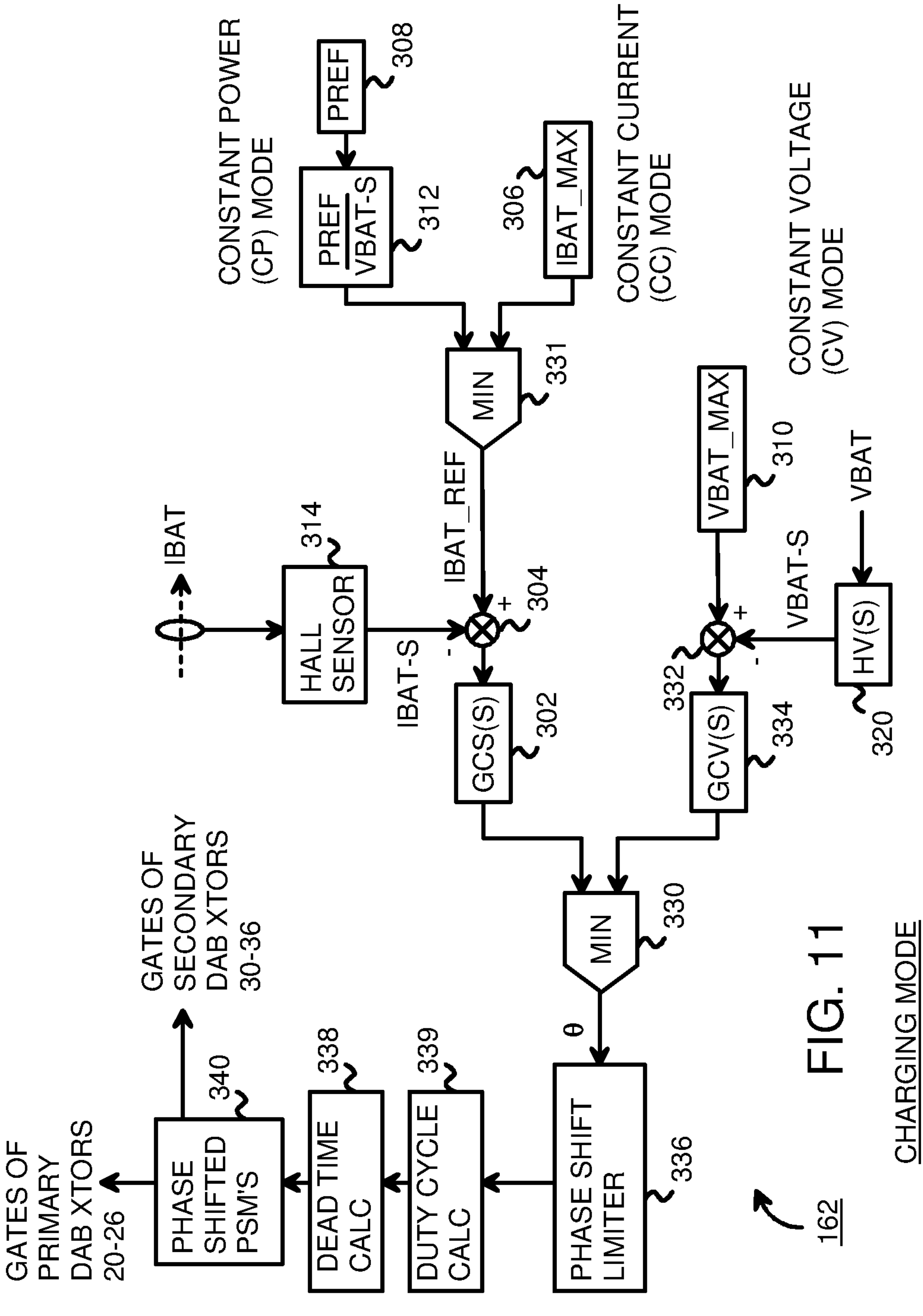
FIG. 11 shows the DAB digital controller configured for a charging mode.

FIG. 11 shows the DAB digital controller configured for a charging mode. For battery charging, all three modes, Constant-Voltage (CV), Constant-Current (CC), and Constant-Power (CP), are considered by the control loop in DAB digital controller 162. The battery voltage VBAT sensed by voltage sensor 320 as VBAT-S while the battery current IBAT is sensed by Hall sensor 314 as IBAT-S.

For CP mode, the reference power PREF in register 308 is divided by the sensed battery voltage VBAT-S by divider 312 to get the CP mode current limit that is applied to the upper input of minimizer 331.

For CC mode, the battery current limit IBAT_MAX from register 306 is applied to the lower input of minimizer 331. Minimizer 331 selects as IBAT_REF the smaller of IBAT_MAX for CC mode or PREF/VBAT-S for CP mode.

The sensed battery current IBAT-S is subtracted by adder 304 from reference battery current IBAT_REF and integrated by Proportional-Integrator (PI) 302 to obtain the CC/CP modes reference.

For CV mode, the Constant-Voltage (CV) mode reference, VBAT_MAX, is stored in register 310. The battery voltage VBAT-S sensed by voltage sensor 320 is subtracted by adder 332 from VBAT_MAX from register 310 and then integrated by Proportional-Integrator (PI) 334 for input to minimum selector 330.

Minimum selector 330 selects the minimum reference from among the CP/CC mode (upper input from PI 302) and the CV mode (lower input from PI 334). Thus for battery charging, all three modes, Constant-Voltage (CV), Constant-Current (CC), and Constant-Power (CP), are considered by the control loop in DAB digital controller 162.

CV mode is triggered when the phase shift reference for CV mode, generated by PI 334, is smaller than the phase shift reference for CP/CC mode, generated by PI 302. Then minimum selector 330 selects the reference for CV mode.

The output of minimum selector 330 is theta θ that is limited by phase shift limiter 336. The duty cycle is calculated by duty cycle calculator while the dead time is calculated by dead time calculator 338. Dead-time calculator 338 calculates the dead time when the pull-up and pull-down transistors are both off during switching to prevent current surges. The PSM control signals to the gates of primary-side transistors 20, 22, 24, 26 are generated by phase-shifted PSM controller 340 based on the control loop calculation of phase shift θ. The phase shift along with the duty ratio can be modulated for phase shift modulation control. The control signals to the gates of secondary-side transistors 30, 32, 34, 36 are also generated by phase-shifted PSM controller 340.

Figure 12:
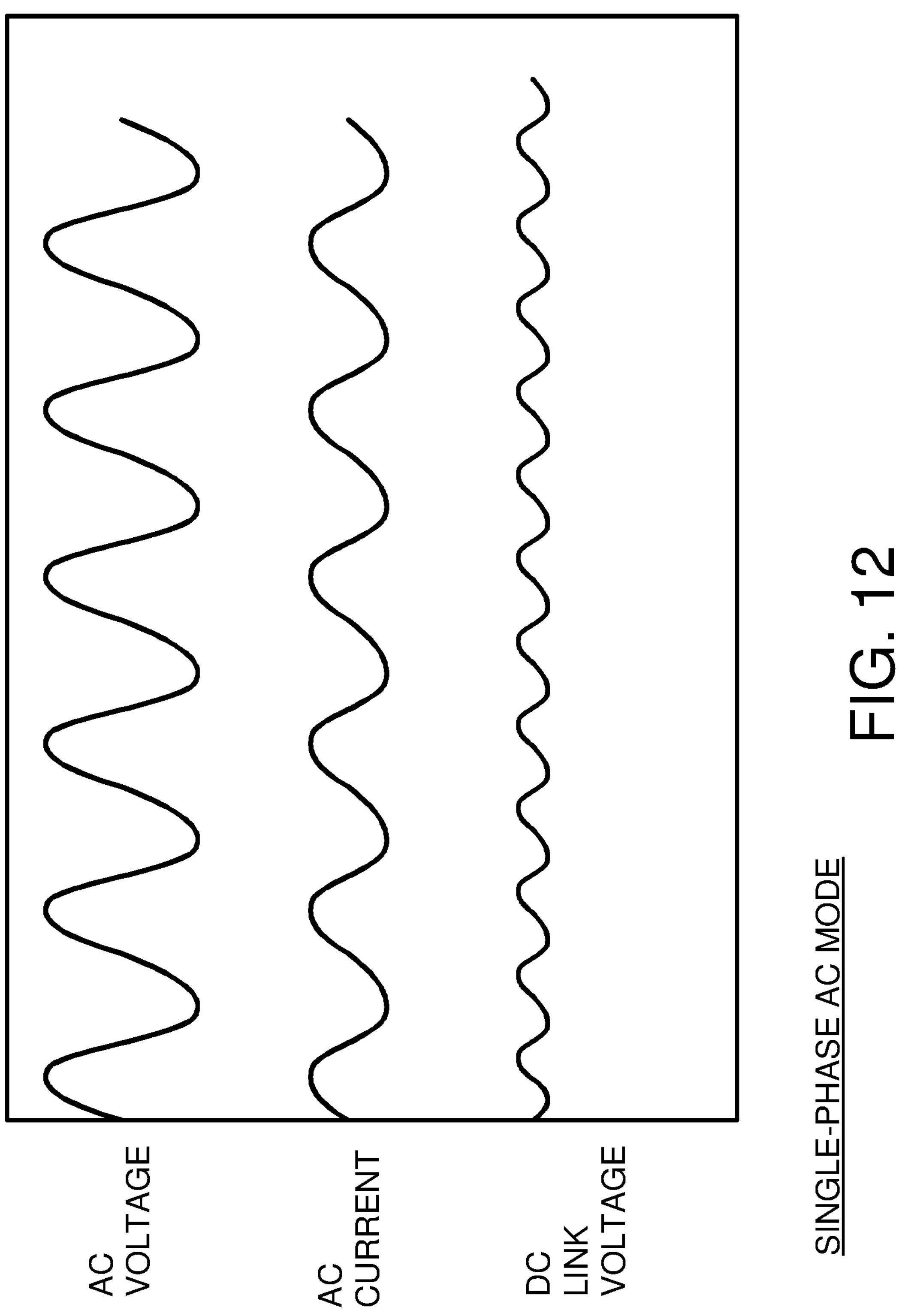
FIG. 12 is a plot of the two-stage converter operating in single-phase AC charging mode.

FIG. 12 is a plot of the two-stage converter operating in single-phase AC charging mode. The AC input has a sine wave for the AC voltage and the AC current measured on input A/P. The DC link voltage fluctuates with the AC input, but the fluctuations are very small. For example, when the AC input voltage is +/−300 volts, the peak AC current is 20 A, and the DC link voltage is 380 volts +/−12 volts. So the fluctuation on the DC link voltage is 24/380, or about 6%. Total Harmonic Distortion (THD) is low. The AC current is in-phase with the AC voltage and operating with totem pole power factor correction control.

Figure 13:
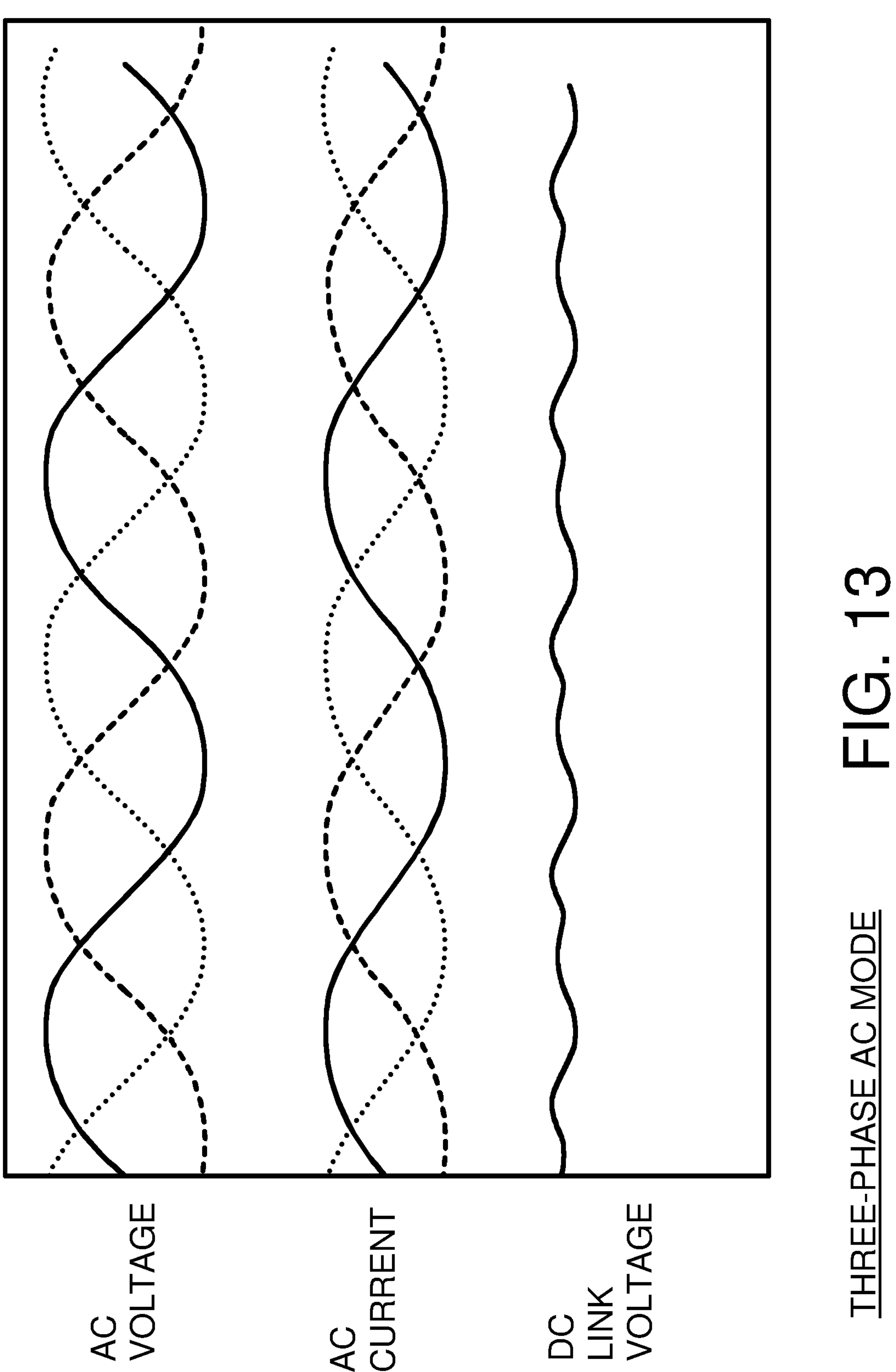
FIG. 13 is a plot of the two-stage converter operating in three-phase AC charging mode.

FIG. 13 is a plot of the two-stage converter operating in three-phase AC charging mode. The AC input has three sine waves, for the A, B, and C AC inputs. These sine waves are separated in phase by 120 degrees. The AC current is in-phase with the AC voltage for each of the 3 inputs. Each sine wave alternates in voltage from −300 volts to +300 volts, with the current alternating from −20 A to +20 A. PFC 150 is operating with space vector PWM control with a low THD. The input AC current is almost in phase with the input AC voltage.

The DC link voltage fluctuates with the three AC inputs, but the fluctuations are very small. For example, when the AC input voltage is +/−300 volts, the DC link voltage fluctuates from about 649.9 volts to 650.2 volts. So the fluctuation or ripple on the DC link voltage is 0.3/650, or about 0.05%.

Alternate Embodiments

Several other embodiments are contemplated by the inventors. For example, pull-up transistor 220 and pull-down transistor 222 can both be n-channel transistors, or pull-up transistor 220 could be a p-channel transistor and pull-down transistor 222 could be an n-channel transistor, with the gate voltages inverted to account for the inherent p-channel inversion of logic. Other transistors could likewise all be n-channel or could have p-channel pull-ups.

While an AC-DC first stage and a DC-DC second stage have been described, other combinations are possible, such as two DC-DC stages. For example, the first stage can be a buck converter, boost converter, buck-boost converter or other unidirectional or bidirectional DC-DC converters. The second stage can be a CLLLC DAB converter, LCL DAB converter or other immittance-based DAB converters. The first stage and second stage are connected together by a DC link voltage VLNK that is generated on a link capacitor so that the first stage can generate a variable VLNK based on a function of the reference output current/power of the second stage.

Although support for 3 modes CP, CC, CV has been described, some of these modes may not be supported in some embodiments. For example, only CP or CC mode may be supported.

DAB digital controller 162 may generate the PSM control signals with a fixed switching frequency equal to a resonant frequency of DAB 160 for maximum efficiency.

Constant parameters have a fixed value that does not vary during operation, but operating conditions such as the output power can be held constant by being held within a fixed range, such as within 10% of a target.

The constant K that is multiplied by multiplier 270 can be calculated to be within 10% (0.9) as $$K = \frac{1}{0.9} \cdot \frac{\pi^2 |Z_m|}{8n \cdot (1)}$$

where Zm is the equivalent impedance of the simplified model of FIG. 8B, and n is the turns ratio N1/N2, where N1 is the number of turns in primary windings 52 and N2 is the number of turns in secondary windings 54. K is dependent on the design parameters of the CLLLC converter.

While comparison to the DC link voltage, the battery voltage, and the battery current have been described, the actual comparisons may be made to a derivative or sensed versions of these physical voltages and currents. Digital versions of these voltages and currents could be generated be an ADC and then digitally compared. Sensing of these voltages and currents could prevent disturbance of these nodes. Thus when comparison to the DC link voltage is described, it is understood that this comparison may be performed by comparison to a derivative or sensed version of the DC link voltage.

Bidirectional operation in reverse may be obtained by setting the phase shift θ to be a negative value, which means the primary voltage leads the secondary voltage. Zero Voltage Switching (ZVS) can be achieved on all transistors to prevent voltage spikes and reduce switching losses. The DAB converter is suitable for a wide range of output voltages and load conditions. Loads that are not batteries may also be supported. With the variable DC link voltage, the modulation factor M may be kept high to minimize reactive power in both the primary and secondary sides of DAB converter 160 as the output current and power change during charging or other operations.

A constant switching frequency may be used with phase shift modulation to regulate the output power or current. The phase shift can be changed to provide reverse operation, such as EV to grid. The modulation factor M can be kept high to reduce reactive power losses in DAB converter 160.

Various operating conditions may be supported. A few examples are input voltage Vin=375v, output voltage VBAT=359v, output power P=1952 W, and Vin=375v, VBAT=362v, and P=3001 W. Other examples of operating points are for CC mode, VBAT=100v, IBAT=15.5 A, and VBAT=250v, IBAT=15.3 A, and for CP mode VBAT=400v, P=5800 W, and VBAT=500v, P=5800 W. Many other examples and variations are possible. A very wide output voltage range may be supported, allowing for a wider range of EV types to be charged. Higher output power may be obtained at low output voltages, providing a shorter charging time.

DAB converter 160 could have other resonant tank configurations other than CLLLC, such as LCL. Single-phase and three-phase AC may be input to PFC 150. For single-phase ac input, the DC-link voltage may be limited to between 390V-600V, and the rated power of 6.6 kW. For three-phase AC input, the DC-link voltage may be limited to between 650V-845V, and the rated power is 11 kW. Other examples are possible.

Switches could be added to allow the output of DAB converter 160 to connect to a secondary battery or to another load. Various other bypassing or muxing components could be added. Additional ports could be added, and additional switches used to connect to these additional ports. For example, AC home appliances could be placed on a new AC port or could the AC port, or an additional switch could be placed on the AC port to switch between the AC grid and AC appliances. An additional switch could select among solar and primary battery 132 or a secondary battery.

Switches could be power relays or could be transistor switches or transmission gates. During discharging mode, the switching frequency of DAB converter 160 may be fixed at the resonant frequency. Then the DC link voltage is variable and non-regulated, and PFC 150 is used to regulate the AC output current or voltage.

While the two-stage converter may be onboard an EV, the two-stage converter could be located at the home, can be an EV charger station, or can be a portable EV charger, without being onboard an EV. Two-stage converter 120 could be divided into a portion that is on-board the EV and another portion that is at the home or charger station. Two-stage converter 120 could be used for purposes other than EV's, such as for backup power systems, powering industrial or medical equipment. Two-stage converter 120 can also be a renewable energy storage system. During the power grid rush hour, the battery can be discharged to provide energy to the grid, while during low demand times, the battery can be charged from energy from the grid or from a solar panel. Thus is can provide peak power leveling for the power grid's stability and security.

While an EV has been described, the EV could have both an electric engine and an internal combustion engine that burns gasoline, such as for a pug-in hybrid car or EV. The EV could have a second engine that burns gasoline to charge the battery, while having an electric engine for the drive train. The EV can have its own power sources, such as regenerative brakes, and these power sources could directly charge the EV battery, bypassing two-stage converter 120, or could connect to a port on two-stage converter 120.

The DC link voltage can rise when the battery voltage falls over a limited range and can be relatively constant when outside of that operating range. The switching frequency can be considered to be equal to the resonant frequency when they are within a desired range, such as within an order of magnitude, or within 10%. Efficiency is highest when the switching frequency is exactly equal to the resonant frequency, but variances in inductances and capacitances and other circuit features and layouts can make exact matching unreasonable or unrealistic, so matching within a range such as an order of magnitude can be considered a match.

The operation of PFC digital controller 152 and DAB digital controller 162 that are shown by the control loops in FIGS. 6A-6C, 10, 11 could be implemented in various ways and with many variations. Operations may be combined or re-ordered or skipped. Hardware, firmware, software, or various combinations thereof may be used. Timings and phase differences may be adjusted. Some steps may be re-sequenced in other sequences or loops. PFC digital controller 152 and DAB digital controller 162 do not have to be digital controllers but could perform some or all control functions in analog.

More complex logic and control trees could be added to the control loops, such as to add disabling transistors to disable operation, such as for power-down modes. Filters could be added to various nodes, such as by adding capacitors, resistors, inductors, or networks of resistors, capacitors and inductors. Leaker resistors could be added. Parasitic capacitances and resistances may be present. Hysteresis could be added for more complex waveform shaping. Buffers could be added between stages, or more stages or dummy stages could be added. Auxiliary windings could be present in some transformer embodiments, and some embodiments may have more than 3 sets of windings, or in different polarities and configurations.

Calculations such as by a divider, minimum selectors and minimizers, multiplier, etc., could be performed by hardware units, either specific units or general-purpose units that can be programmed by firmware or software. Comparisons could be performed in the analog domain by comparators, op amps, etc., or could be digital comparators that compare digital values that could be generated by an Analog-to-Digital Converter (ADC) from analog voltages and currents. Calculational logic could be shared or reused or could be dedicated.

Different transistor, capacitor, resistor, and other device sizes can be used, and various layout arrangements can be used, such as multi-leg, ring, doughnut or irregular-shape transistors.

Some PWM or PSM control signals have been described as having 180-degree phase separations. It is understood that these are ideal phase values, and that actual phases may vary somewhat, such as +/−5%, 10%, etc., and still be considered to have 180-degree phase separation.

Currents can be positive or negative currents and flow in either direction. Many second and third order circuit effects may be present and may be significant, especially for smaller device sizes. A circuit simulation may be used to account for these secondary factors during design.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word “means” is recited in a claim element, Applicant intends for the claim element to fall under 35 USC Sect. 112, paragraph 6. Often a label of one or more words precedes the word “means”. The word or words preceding the word “means” is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A two-stage power converter comprising:

an Alternating Current (AC) port for connecting to an AC power grid;

a Direct Current (DC) port for connecting to a battery;

a battery current sensor for sensing a battery current to the battery from the DC port;

a link capacitor having a DC link voltage on a link node;

an AC converter, coupled to the AC port, for converting AC power from the AC power grid to the DC link voltage on the link node when connected to the link capacitor;

a Dual Active Bridge (DAB) converter that receives the DC link voltage from the link capacitor, for converting the DC link voltage to a battery voltage on the DC port when charging the battery from the AC power grid;

an AC controller that controls the AC converter, the AC controller generating Pulse-Width- Modulation (PWM) control signals to gates of transistors in the AC converter;

a first modulator that divides a reference power constant by the battery voltage to generate a battery current reference, and that multiplies the battery current reference by a constant to generate a link reference that is compared with the DC link voltage to modulate the PWM control signals generated by the AC controller;

a DAB controller that controls the DAB converter, the DAB controller generating primary control signals to gates of primary-side transistors in the DAB converter, the DAB controller also generating secondary control signals to secondary-side transistors in the DAB converter; and a second modulator that modulates a duty ratio and a phase difference between the primary control signals and the secondary control signals generated by the DAB controller by comparing the battery current reference to the battery current during a Constant-Power mode, and by comparing a battery current limit to the battery current during a Constant- Current mode, and by comparing a battery voltage limit to the battery voltage during a Constant-Voltage mode;

whereby the DC link voltage and the battery voltage control operation of the AC converter and the battery voltage and battery current control operation of the DAB converter.

2. The two-stage power converter of claim 1 wherein the DC link voltage falls as the battery voltage rises when the battery is being charged during a Constant-Power mode;

wherein the DC link voltage is not a fixed voltage during battery charging, the DC link voltage being a variable voltage that falls as the battery voltage rises during charging in the Constant-Power mode.

3. The two-stage power converter of claim 1 wherein the AC port further comprises:

an A/P line for connecting to a P line for one-phase AC power, and for connecting to an A line for three-phase AC power;

a B line for connecting to a B line for three-phase AC power;

a C/N line for connecting to an N line for one-phase AC power, and for connecting to a C line for three-phase AC power;

wherein the A, B and C lines each carry an AC wave that is separated from AC waves on others of the A, B, and C lines by a 120-degree phase;

a first switch for shorting the B line to the A/P line when the AC port receives one-phase AC power, and for isolating the B line from the A/P line when the AC port receives three-phase AC power;

wherein the AC converter further comprises:

a first series inductor connecting the A/P line to an A node;

an A upper transistor having a gate to control current conduction between the A node and an upper node;

an A lower transistor having a gate to control current conduction between the A node and a ground node;

a second series inductor connecting the B line to a B node;

a B upper transistor having a gate to control current conduction between the A node and the upper node;

a B lower transistor having a gate to control current conduction between the A node and the ground node;

a third series inductor connecting the C/N line to a C node;

a C upper transistor having a gate to control current conduction between the A node and the upper node;

a C lower transistor having a gate to control current conduction between the A node and the ground node;

wherein the upper node is connected to an upper terminal of the link capacitor when charging the battery from the AC power grid;

wherein a lower terminal of the link capacitor is connected to the ground node.

4. The two-stage power converter of claim 1 wherein the DAB converter further comprises:

a transformer having primary windings and secondary windings;

a primary bridge receiving the DC link voltage and driving the primary windings of the transformer through a first capacitor and a first inductor in series with the primary windings;

a secondary bridge connected to the battery voltage from the DC port, the secondary bridge driving the secondary windings of the transformer through a second capacitor and a second inductor in series with the secondary windings when the battery is being discharged;

wherein the DAB converter operates as a CLLLC resonant power converter when charging the battery.

5. The two-stage power converter of claim 4 wherein the primary bridge further comprises:

a first upper primary transistor having a gate for controlling current between the link node and a first primary node;

a second upper primary transistor having a gate for controlling current between the link node and the first primary node;

a first lower primary transistor having a gate for controlling current between a ground node and a second primary node;

a second lower primary transistor having a gate for controlling current between the ground node and the second primary node;

wherein the first primary node and the second primary node drive a current loop through the primary windings of the transformer through the first capacitor and the first inductor in series with the primary windings.

6. The two-stage power converter of claim 5 wherein the secondary bridge further comprises:

a first upper secondary transistor having a gate for controlling current between the DC port having the battery voltage and a first secondary node;

a second upper secondary transistor having a gate for controlling current between the DC port having the battery voltage and the first secondary node;

a first lower secondary transistor having a gate for controlling current between a battery ground and a second secondary node;

a second lower secondary transistor having a gate for controlling current between the battery ground and the second secondary node;

wherein the first secondary node and the second secondary node drive a current loop through the secondary windings of the transformer through the second capacitor and the second inductor in series with the secondary windings.

7. The two-stage power converter of claim 4 wherein the AC controller generates the PWM control signals to a first pair and to a second pair of transistors in the AC converter to have a switching frequency that is at least double of an AC line frequency of the AC port, the AC controller generating control signals to a third pair of transistors in the AC converter to have a switching frequency equal to the AC line frequency.

8. The two-stage power converter of claim 7 wherein the second modulator for controlling the DAB controller further comprises:

a first selector that receives the reference power constant and receives the battery current limit and selects a smaller of the battery current reference and the battery current limit as a selected current reference;

a first comparator that compares the selected current reference to the battery current to generate a first modulation factor;

a second comparator that compares the battery voltage limit to the battery voltage to generate a second modulation factor;

a second selector that receives the first modulation factor and the second modulation factor and selects a smaller of the first modulation factor and the second modulation factor as a phase shift factor;

a phase shift limiter that limits the phase shift factor;

wherein the DAB controller modulates the duty ratio and the phase difference between the primary control signals and the secondary control signals in response to the phase shift factor.

9. A two-stage variable-link-voltage converter comprising:

a Power-Factor Converter (PFC) having an Alternating Current (AC) input and an output driving a Direct Current (DC) link capacitor that generates a DC link voltage;

a Dual Active Bridge (DAB) converter that receives the DC link voltage from the DC link capacitor and generates an output having a battery voltage and a battery current;

a PFC controller that generates Pulse-Width-Modulation (PWM) control signals to transistors in the PFC;

a DAB controller that generates primary control signals to primary transistors in a primary side of the DAB converter, and that generates secondary control signals to secondary transistors in a secondary side of the DAB converter, wherein the primary side and the secondary side are connected at a transformer;

a divider that receives a reference power constant that represents a constant value of output power of the battery voltage and the battery current, the divider dividing the reference power constant by the battery voltage to generate a battery current reference that varies with the battery voltage;

a multiplier that multiplies the battery current reference by a constant to generate a link reference that varies with the battery voltage;

a first comparator that compares the DC link voltage to the link reference to generate a first modulation factor applied to the PFC controller;

wherein the first modulation factor causes the PFC controller to modulate the PWM control signals to transistors in the PFC in response to changes in the DC link voltage and to changes in the battery voltage;

a first limiter that limits the battery current reference to a maximum battery current limit; and a Constant-Power/Constant-Current (CP/CC) comparator that compares the battery current to the battery current reference to generate a CP/CC modulation factor;

wherein the CP/CC modulation factor modulates a phase difference between the primary control signals and the secondary control signals generated by the DAB controller when the CP/CC modulation factor is applied to the DAB controller during a CP mode when power is held constant and during a CC mode when the battery current is held constant;

whereby the PFC controller modulates the DC link voltage in response to the first modulation factor that is generated by dividing the reference power constant by the battery voltage from the DAB converter and multiplying by the constant and comparing to the DC link voltage.

10. The two-stage variable-link-voltage converter of claim 9 wherein the DAB controller modulates a duty cycle ratio between the primary control signals and the secondary control signals in response to the CP/CC modulation factor during CP mode or during CC mode.

11. The two-stage variable-link-voltage converter of claim 9 wherein the DAB controller modulates a phase between the primary control signals and the secondary control signals in response to the CP/CC modulation factor during CP mode or during CC mode.

12. The two-stage variable-link-voltage converter of claim 9 further comprising:

a Constant-Voltage (CV) comparator that compares the battery voltage to a maximum battery voltage limit to generate a CV modulation factor;

wherein the DAB controller modulates a duty cycle ratio or a phase between the primary control signals and the secondary control signals in response to the CV modulation factor during CV mode.

13. The two-stage variable-link-voltage converter of claim 12 wherein the CV modulation factor is applied to the DAB controller and the CP/CC modulation factor is ignored when the battery voltage is equal to or above the maximum battery voltage limit.

14. The two-stage variable-link-voltage converter of claim 9 further comprising:

a second limiter that overwrites the link reference with a maximum link voltage limit when the link reference is greater than the maximum link voltage limit;

a third limiter that overwrites the link reference with a minimum link voltage limit when the link reference is less than the minimum link voltage limit;

whereby the DC link voltage is limited to a range between the maximum link voltage limit and the minimum link voltage limit.

* * * * *